(12) United States Patent
Joo et al.

(10) Patent No.: US 11,429,127 B2
(45) Date of Patent: Aug. 30, 2022

(54) LOW DROP-OUT REGULATOR AND POWER MANAGEMENT INTEGRATED CIRCUIT INCLUDING THE SAME

(71) Applicant: Samsung Electronics Co., Ltd., Suwon-si (KR)

(72) Inventors: Seongwon Joo, Seoul (KR); Jeongkyun Woo, Suwon-si (KR); Jeongyeol Bae, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/167,152

(22) Filed: Feb. 4, 2021

(65) Prior Publication Data
US 2021/0397207 A1 Dec. 23, 2021

(30) Foreign Application Priority Data
Jun. 22, 2020 (KR) .......................... 10-2020-0075614

(51) Int. Cl.
*G05F 1/575* (2006.01)
*H02M 1/08* (2006.01)
(Continued)

(52) U.S. Cl.
CPC .............. *G05F 1/575* (2013.01); *H02M 1/08* (2013.01); *H02M 1/0009* (2021.05); *H02M 1/0045* (2021.05); *H02M 3/158* (2013.01)

(58) Field of Classification Search
CPC ... G05F 1/00; G05F 1/465; G05F 1/56; G05F 1/575; G05F 3/00; G05F 3/30;
(Continued)

(56) References Cited

U.S. PATENT DOCUMENTS 6,600,299 B2    7/2003    Xi et al.
6,603,292 B1 *  8/2003    Schouten ................ G05F 1/573
                                                323/274

(Continued)

OTHER PUBLICATIONS

Bu, Shi et al. "A Fully Integrated Low-Dropout Regulator With Differentiator-Based Active Zero Compensation." *IEEE Transactions on Circuits and Systems—I: Regular Papers*, vol. 65, No. 10 (Oct. 2018): pp. 3578-3591.

(Continued)

*Primary Examiner* — Thomas J. Hiltunen
*Assistant Examiner* — Dave Mattison
(74) *Attorney, Agent, or Firm* — Harness, Dickey & Pierce, P.L.C.

(57) ABSTRACT

An LDO regulator includes an error amplifier, a power transistor, a monitoring circuit and/or an adaptive pole adjusting circuit (APAC). The error amplifier compares a reference voltage and a feedback voltage to generate a first error voltage based on the comparison. The power transistor including a gate coupled to an output terminal of the buffer, regulates an input voltage based on a second error voltage which is generated based on the first error voltage to provide an output voltage to an output node. The monitoring circuit, connected to the output terminal of the buffer in parallel with the power transistor, generates a control voltage associated with a load current. The APAC, connected between the output terminal of the error amplifier and the ground voltage, selectively connects an adjusting capacitor between the output terminal of the error amplifier and the ground voltage in response to the control voltage.

19 Claims, 17 Drawing Sheets

(51) Int. Cl.
*H02M 3/158* (2006.01)
*H02M 1/00* (2006.01)

(58) Field of Classification Search
CPC ............ G11C 5/00; G11C 5/147; H02M 1/00; H02M 1/0009; H02M 1/0045; H02M 1/08; H02M 3/00; H02M 3/158
USPC .......................................................... 327/540
See application file for complete search history.

(56) References Cited

U.S. PATENT DOCUMENTS

| | | | |
|---|---|---|---|
| 7,091,710 B2 | 8/2006 | Yang et al. | |
| 7,446,515 B2 | 11/2008 | Wang | |
| 7,589,507 B2 | 9/2009 | Mandal | |
| 7,710,091 B2 | 5/2010 | Huang | |
| 8,547,077 B1 | 10/2013 | Chang | |
| 8,810,224 B2 | 8/2014 | Zhang et al. | |
| 8,947,060 B2 | 2/2015 | Lin et al. | |
| 9,256,237 B2 | 2/2016 | Kim et al. | |
| 9,274,534 B2 | 3/2016 | Fang et al. | |
| 9,588,541 B1 | 3/2017 | Ho et al. | |
| 10,423,178 B1 | 9/2019 | Chen | |
| 2017/0115678 A1* | 4/2017 | Qing | ........................ G05F 1/575 |
| 2018/0120879 A1* | 5/2018 | Du | ........................ G05F 1/575 |

OTHER PUBLICATIONS

Qu, Wanyuan et al. "Design-Oriented Analysis for Miller Compensation and Its Application to Multistage Amplifier Design." *IEEE Journal of Solid-State Circuits*, vol. 52, No. 2 (Feb. 2017): pp. 517-527.

* cited by examiner

LOW DROP-OUT REGULATOR AND POWER MANAGEMENT INTEGRATED CIRCUIT INCLUDING THE SAME

CROSS-REFERENCE TO RELATED APPLICATIONS

This application claims priority under 35 U.S.C. § 119 to Korean Patent Application No. 10-2020-0075614, filed on Jun. 22, 2020, the disclosure of which is incorporated by reference herein in its entirety.

TECHNICAL FIELD

Example embodiments of the present disclosure relate to voltage regulators, and more particularly, to low drop-out (LDO) regulators and power management integrated circuits (PMIC)s including the same.

DISCUSSION OF THE RELATED ART

LDO regulators are devices which provide a stable voltage. A LDO regulator may be a linear regulator which provides a lower output voltage than an input voltage.

Although the LDO regulator has power losses because of an output voltage which is lower than an input voltage, the LDO may provide a stable output voltage. The LDO regulator may also have superior line and load regulation characteristics. Thus, the LDO regulator may be used in various fields, such as PMIC.

SUMMARY

Example embodiments provide an LDO regulator capable of adaptively adjusting a frequency of pole of an output of an error amplifier based on a load current.

Example embodiments provide a PMIC including an LDO regulator capable of adaptively adjusting a frequency of pole of an output of an error amplifier based on a load current.

According to example embodiments, an LDO regulator includes an error amplifier, a buffer, a power transistor, a feedback circuit, a monitoring circuit and an adaptive pole adjusting circuit (APAC). The error amplifier compares a reference voltage and a feedback voltage to generate a first error voltage based on the comparison. The buffer, connected to an output terminal of the error amplifier, buffers the first error voltage to output a second error voltage. The power transistor including a gate coupled to an output terminal of the buffer, regulates an input voltage based on the second error voltage to provide an output voltage to an output node. The feedback circuit, connected between the output node and a ground voltage, divides the output voltage to provide the feedback voltage. The monitoring circuit, connected to the output terminal of the buffer in parallel with the power transistor, generates a control voltage associated with a load current flowing from the output node to a load, based on the second error voltage and the input voltage. The APAC, connected between the output terminal of the error amplifier and the ground voltage, selectively connects an adjusting capacitor between the output terminal of the error amplifier and the ground voltage in response to the control voltage.

According to example embodiments, a PMIC includes at least one switching regulator, a plurality of LDO regulators and a controller. The at least one switching regulator generates a conversion voltage from a battery voltage. The LDO regulators generate a plurality of output voltages based on the conversion voltage to provide the plurality of output voltages to a plurality of consumers, respectively. The controller generates a voltage control signal to adjust a switching timing of the at least one switching regulator based on the conversion voltage. Each of the LDO regulators includes an error amplifier, a power transistor and an APAC. The error amplifier compares a reference voltage and a feedback voltage to generate a first error voltage based on the comparison. The power transistor regulates the conversion voltage to provide a corresponding output voltage from among the plurality of output voltages to an output node based on a second error voltage which is based on the first error voltage. The APAC, connected between an output terminal of the error amplifier and a ground voltage, selectively connect an adjusting capacitor between the output terminal of the error amplifier and the ground voltage in response to the second error voltage and a control voltage generated based on the conversion voltage.

According to example embodiments, an LDO regulator includes an error amplifier, a buffer, a power transistor, a feedback circuit, a monitoring circuit and an adaptive pole adjusting circuit (APAC). The error amplifier compares a reference voltage and a feedback voltage to generate a first error voltage based on the comparison. The buffer, connected to an output terminal of the error amplifier, buffers the first error voltage to output a second error voltage. The power transistor including a gate coupled to an output terminal of the buffer, regulates an input voltage based on the second error voltage to provide an output voltage to an output node. The feedback circuit, connected between the output node and a ground voltage, divides the output voltage to provide the feedback voltage. The monitoring circuit, connected to the output terminal of the buffer in parallel with the power transistor, generates a control voltage associated with a load current flowing from the output node to a load, based on the second error voltage and the input voltage. The APAC, connected between the output terminal of the error amplifier and the ground voltage, selectively connects an adjusting capacitor between the output terminal of the error amplifier and the ground voltage in response to the control voltage. The monitoring circuit includes a first p-channel metal oxide semiconductor (PMOS) transistor and a monitoring resistor. The first PMOS transistor, connected between the input voltage and a first node, has a gate receiving the second error voltage. The monitoring resistor is connected between the first node and the ground voltage. The first PMOS transistor provides the first node with a mirror current corresponding to the load current. The monitoring circuit provides the control voltage corresponding to the mirror current at the first node.

Accordingly, the monitoring circuit, connected parallel with the power transistor, monitors the load current provided to the load, generates the control voltage associated with a magnitude of the load current. The APAC, connected between an output terminal of the error amplifier and the ground voltage may adaptively adjust a frequency of a pole of the output of the error amplifier based on the control voltage. Therefore, the LDO regulator may operate stably in various load cases.

BRIEF DESCRIPTION OF THE DRAWINGS

The above and other features of the present disclosure will become more apparent by describing in detail example embodiments thereof with reference to the accompanying drawings.

DETAILED DESCRIPTION OF EXAMPLE EMBODIMENTS

Figure 1:
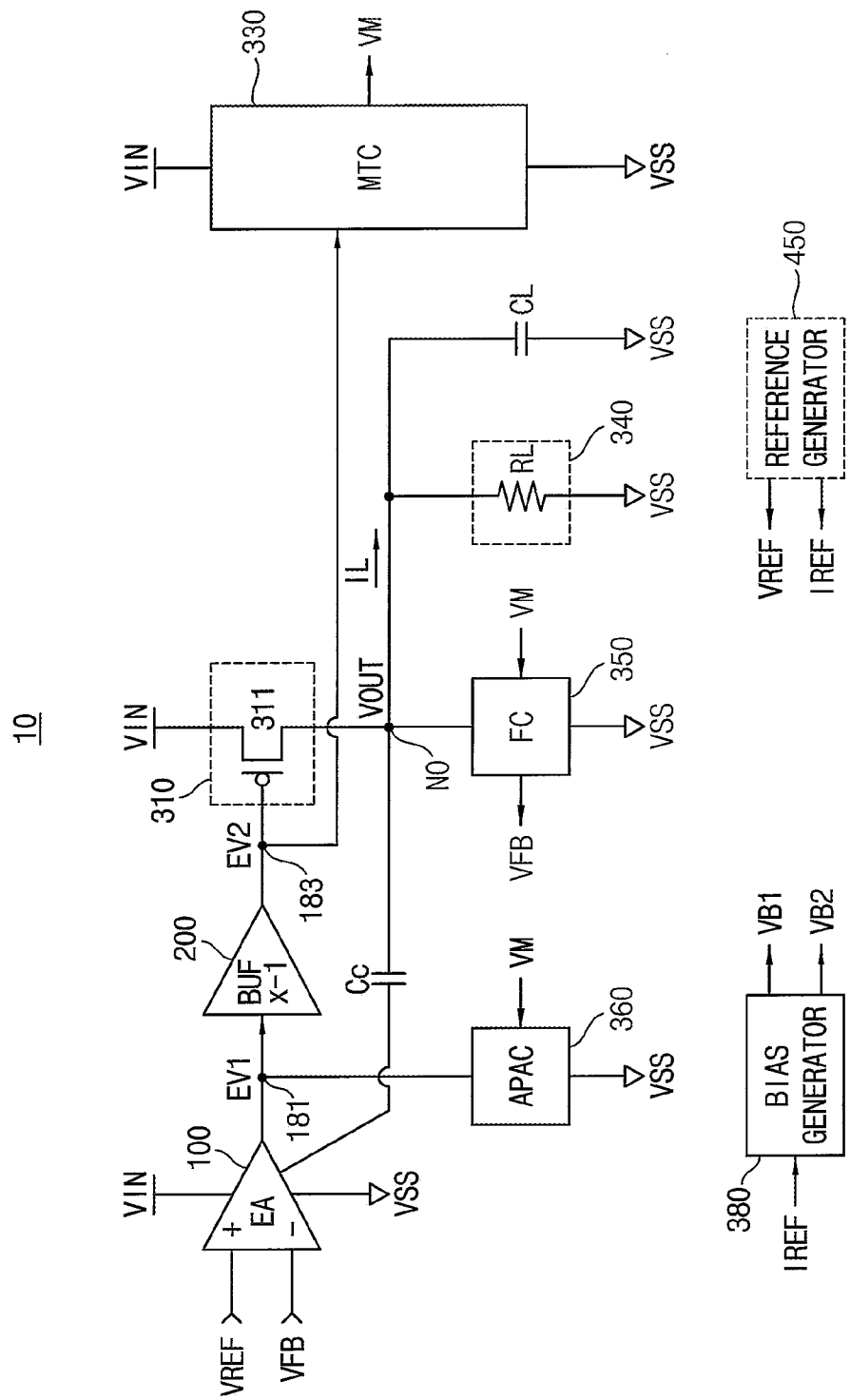
FIG. 1 is a block diagram illustrating a low drop-out (LDO) regulator according to example embodiments.

Example embodiments of the present disclosure will be described more fully hereinafter with reference to the accompanying drawings. Like reference numerals may refer to like elements throughout the accompanying drawings.

FIG. 1 is a block diagram illustrating a low drop-out (LDO) regulator according to example embodiments.

Referring to FIG. 1 an LDO regulator 10 may include an error amplifier (EA) 100, a buffer (BUF) 200, a pass element 310 including a power transistor 311, a feedback circuit (FC) 350, a monitoring circuit (MTC) 330 and/or an adaptive pole adjusting circuit (APAC) 360.

In addition, the LDO regulator 10 may further include a compensation capacitor Cc, a bias voltage generator 380 and/or a reference generator 450. The compensation capacitor Cc is connected between an internal node of the error amplifier 100 and an output node NO.

In FIG. 1, a load 340 and a load capacitor CL which are connected between the output node NO and a ground voltage VSS are also illustrated. The load capacitor CL is connected between the output node NO and the ground voltage VSS in parallel with respect to the load capacitor CL.

The error amplifier 100 is connected between the input voltage VIN and the ground voltage VSS, receives a reference voltage VREF and a feedback voltage VFB, compares the reference voltage VREF and the feedback voltage VFB and amplifies a difference between the reference voltage VREF and the feedback voltage VFB based on the comparison to generate a first error voltage EV1 corresponding to the difference and outputs the first error voltage EV1 to a first intermediate node 181 corresponding to an output terminal of the error amplifier 100.

The first error voltage EV1 may correspond to the difference between the reference voltage VREF and the feedback voltage VFB. The error amplifier 100 has a positive (+) input terminal to receive the reference voltage VREF and a negative (−) input terminal to receive the feedback voltage VFB. The reference voltage VREF may be provided from the reference generator 450.

The buffer 200 is connected to the output terminal of the error amplifier 100 at the first intermediate node 181, buffers the first error voltage EV1 and output a second error voltage EV2 to a second intermediate node 183. The second intermediate node 183 corresponds to an output terminal of the buffer 200. The buffer 200 may have a gain of −1. Although not illustrated, the buffer 200 may be connected between the input voltage VIN and the ground voltage VSS.

The power transistor 311 is connected to the output terminal of the buffer 200 at the second intermediate node 183 and has a gate receiving the second error voltage EV2, and regulates the input voltage VIN based on the second error voltage EV2 to provide an output voltage VOUT to the output node NO. A load current IL corresponding to the output voltage VOUT is provided to the load 340 from the output node NO.

The power transistor 311 has a source coupled to the input voltage VIN, a gate to receive the second error voltage VIN and a drain coupled to the output node NO. When the load current IL increases, a level of the output voltage VOUT decreases and a level of the first error voltage EV1 increases. A level of the second error voltage EV2 decreases in response to the level of the first error voltage EV1 increasing. When the level of the second error voltage EV2 decreases, the level of the output voltage VOUT2 increases.

When the load current IL decreases, the level of the output voltage VOUT increases and the level of the first error voltage EV1 decreases. The level of the second error voltage EV2 increases in response to the level of the first error voltage EV1 decreasing. When the level of the second error voltage EV2 increases, the level of the output voltage VOUT2 decreases.

Therefore, when the load current IL increases, the level of the second error voltage EV2 decreases and when the load current IL decreases, the level of the second error voltage EV2 increases.

The feedback circuit 350 is connected between the output node NO and the ground voltage VSS, generates the feedback voltage VFB by dividing the output voltage VOUT and provides the feedback voltage VFB to the error amplifier 100.

The monitoring circuit 330 is connected to the output terminal of the buffer 200 at the second intermediate node 183 in parallel with the power transistor 311 and receives the second error voltage EV2. The monitoring circuit 330 may be connected between the input voltage VIN and the ground voltage VSS. The monitoring circuit 330 may generate a control voltage VM based on the second error voltage EV2 and the input voltage VIN. The monitoring circuit 330 may monitor the load current IL, provided from the power transistor 311 to the load 340 connected to the output node NO, and may generate the control voltage VM associated with a magnitude of the load current IL. The monitoring circuit 330 may provide the control voltage VM to the feedback circuit 350 and the APAC 360.

The APAC 360 is connected between the first intermediate node 181 and the ground voltage VSS and may selectively connect an adjusting voltage between the first intermediate node 181 and the ground voltage VSS. The APAC 360 may adaptively adjust a frequency of a pole of an output of the error amplifier 100 by selectively connecting the adjusting voltage between the first intermediate node 181 and the ground voltage VSS.

The bias voltage generator 380 generates a first bias voltage VB1 and a second bias voltage VB2 based on a reference current IREF and provides the first bias voltage VB1 and the second bias voltage VB2 to the error amplifier 100.

The reference generator 450 generates the reference voltage VREF and the reference current IREF, provides the reference voltage VREF to the error amplifier 100 and provides the reference current IREF to the bias voltage generator 380. The reference generator 450 may be disposed in an inside or an outside of the LDO regulator 10.

Figure 2:
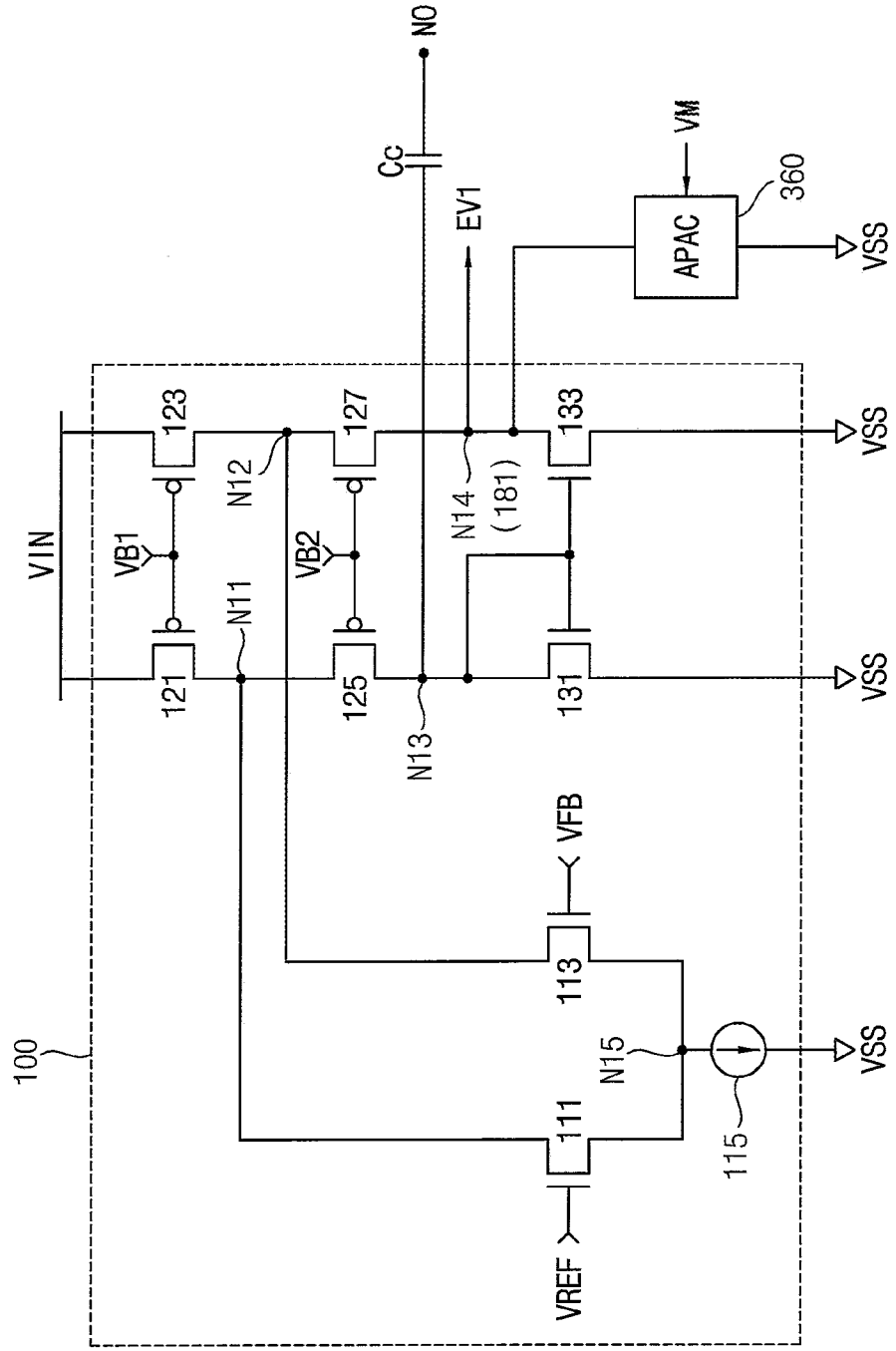
FIG. 2 is a circuit diagram illustrating an example of the error amplifier in the LDO regulator of FIG. 1 according to example embodiments.

FIG. 2 is a circuit diagram illustrating an example of the error amplifier in the LDO regulator of FIG. 1 according to example embodiments.

Referring to FIG. 2, the error amplifier 100 may include first through fourth p-channel metal oxide semiconductor (PMOS) transistors 121, 123, 125 and 127, first through fourth n-channel metal oxide semiconductor (NMOS) transistors 131, 133, 111 and 113 and a current source 115.

The first PMOS transistor 121 is connected between the input voltage VIN and a first node N11. The second PMOS transistor 123 is connected between the input voltage VIN and a second node N12 and has a gate coupled to a gate of the first PMOS transistor 121. A gate of the first PMOS transistor 121 and a gate of the second PMOS transistor 123 receive the first bias voltage VB1.

The third PMOS transistor 125 is connected between the first node N11 and a third node N13. The fourth PMOS transistor 127 is connected between the second node N12 and a fourth node N14 and has a gate coupled to a gate of the third PMOS transistor 125. A gate of the third PMOS transistor 125 and a gate of the fourth PMOS transistor 127 receive the second bias voltage VB2.

The first NMOS transistor 131 is connected between the third node N13 and the ground voltage VSS and has a gate coupled to the third node N13. The second NMOS transistor 133 is connected between the fourth node N14 and the ground voltage VSS and has a gate coupled to the third node N13. Therefore, the first NMOS transistor 131 and the second NMOS transistor 133 may constitute a current mirror.

The third NMOS transistor 111 is connected between the first node N11 and a fifth node N15, and has a gate receiving the reference voltage VREF. The fourth NMOS transistor 113 is connected between the second node N12 and the fifth node N15, and has a gate receiving the feedback voltage VFB. The current source 115 is connected between the fifth node N15 and the ground voltage VSS and provides a constant current to the fifth node N15.

When reference voltage VREF is provided to a gate of the third NMOS transistor 111 and the feedback voltage VFB is provided to a gate of the fourth NMOS transistor 113, currents provided to drains of the third PMOS transistor 125 and the fourth PMOS transistor 127 are determined based on the reference voltage VREF and the feedback voltage VFB, respectively.

Because the first NMOS transistor 131 and the second NMOS transistor 133 may constitute a current mirror, currents flowing through the first NMOS transistor 131 and the second NMOS transistor 133 are the same. Therefore, the first error voltage EV1 provided to the buffer 200 from the fourth node N14 has a level corresponding to the difference of the feedback voltage VFB and the reference voltage VREF.

The fourth node N14 may correspond to the first intermediate node 181 in FIG. 1. In addition, the compensation capacitor Cc may be coupled between the third node N13 and the output node NO. In addition, the APAC 360 may be connected between the fourth node N14 and the ground voltage VSS.

Figure 3:
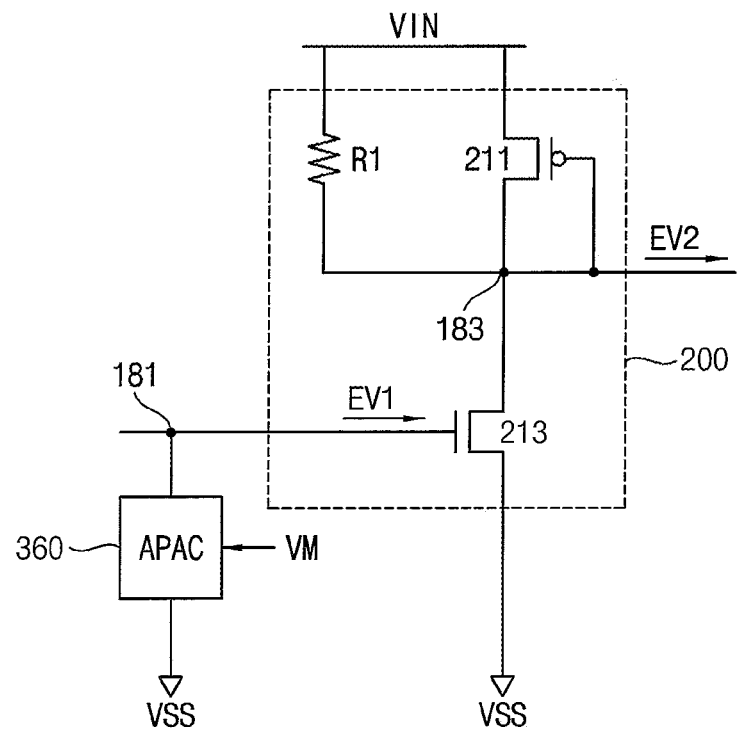
FIG. 3 is a circuit diagram illustrating an example of the buffer in the LDO regulator of FIG. 1 according to example embodiments.

FIG. 3 is a circuit diagram illustrating an example of the buffer in the LDO regulator of FIG. 1 according to example embodiments.

Referring to FIG. 3, the buffer 200 may include a first PMOS transistor 211, a first resistor R1 and/or a first NMOS transistor 213.

The first PMOS transistor 211 is connected between the input voltage VIN and the second intermediate node 183 and has a gate coupled to the first intermediate node 181. The first resistor R1 is connected between the input voltage VIN and the first intermediate node 118 in parallel with the first PMOS transistor 211. The first NMOS transistor 213 is connected between the second intermediate node 183 and the ground voltage VSS and has a gate receiving the first error voltage EV1. The APAC 360 is connected between the second intermediate node 183 and the ground voltage VSS.

A current corresponding to VIN/R1 is provided to the second intermediate node 183 through the first resistor R1. When the level of the second error voltage EV1 provided to the gate of the first NMOS transistor 213 decreases, an amount of a current sinking from the second intermediate node 183 to the ground voltage VSS decreases. When the amount of the current sinking from the second intermediate node 183 to the ground voltage VSS decreases, the level of the second intermediate node 183 (e.g., the second error voltage EV2) increases and a current provided to the second intermediate node 183 through the first PMOS transistor 211 from the input voltage VIN decreases. Because the current provided to the second intermediate node 183 through the first PMOS transistor 211 from the input voltage VIN decreases, the level of the second error voltage EV2 decreases.

Therefore, the buffer 200 buffers the first error voltage EV1 to provide the second error voltage EV2 which decreases as the first error voltage EV1 increases or increases as the first error voltage EV1 decreases.

Figure 4:
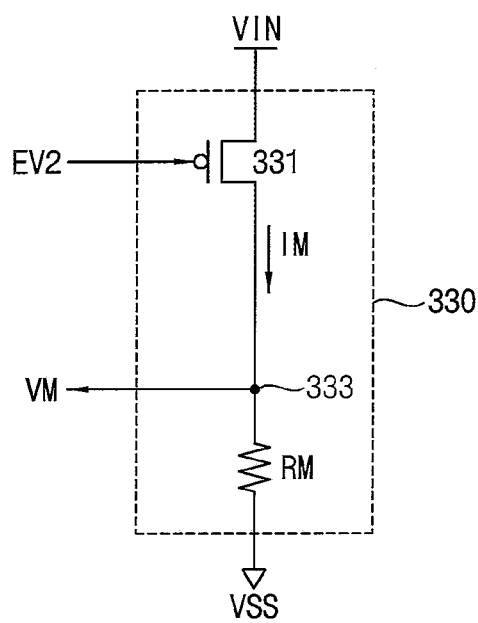
FIG. 4 is a circuit diagram illustrating an example of the monitoring circuit in the LDO regulator of FIG. 1 according to example embodiments.

FIG. 4 is a circuit diagram illustrating an example of the monitoring circuit in the LDO regulator of FIG. 1 according to example embodiments.

Referring to FIG. 4, the monitoring circuit 330 may include a first PMOS transistor 331 and/or a monitoring resistor RM. The first PMOS transistor 331 is connected between the input voltage VIN and a first node 333, and has a gate receiving the second error voltage EV2. Therefore, the first PMOS transistor 331 may provide the first node 333 with a mirror current IM associated with the level of the second error voltage EV2.

As described with reference to FIG. 1, because a magnitude of the load current IL may be varied according to the level of the second error voltage EV2, the mirror current IM may be associated with a magnitude of the load current IL. Therefore, when the level of the second error voltage EV2 increases, the magnitude of the mirror current IM decreases, and when the level of the second error voltage EV2 decreases, the magnitude of the mirror current IM increases.

Because the control voltage VM, a voltage of the first node 333, has a level corresponding to a multiplication of the mirror current IM and the monitoring resistor RM, the monitoring circuit 330 may generate the control voltage VM associated with the magnitude of the load current IL by monitoring the load current IL and may provide the control voltage VM to the feedback circuit 350 and the APAC 360.

In some example embodiments, a current driving capability of the first PMOS transistor 331 is smaller than a current driving capability of the power transistor 311 in FIG. 1. That is, a ratio of a channel width and a channel length of the first PMOS transistor 331 is smaller than a ratio of a channel width and a channel length of the power transistor 311. The current driving capability of the first PMOS transistor 331 and the current driving capability of the power transistor 311 may correspond to 1:n. In example embodiments, n is a natural number equal to or greater than 10.

Figure 5:
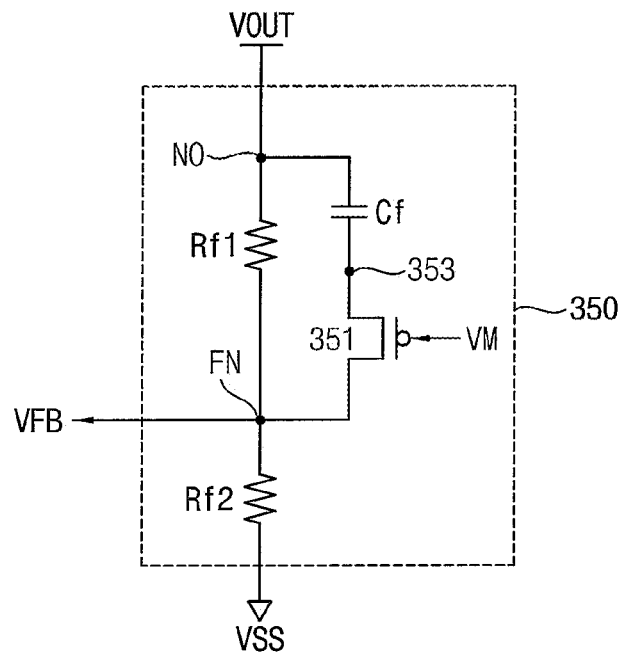
FIG. 5 is a circuit diagram illustrating an example of the feedback circuit in the LDO regulator of FIG. 1 according to example embodiments.

FIG. 5 is a circuit diagram illustrating an example of the feedback circuit in the LDO regulator of FIG. 1 according to example embodiments.

Referring to FIG. 5, the feedback circuit 350 may include a first feedback resistor Rf1, a second feedback resistor Rf2, a feedback capacitor Cf and/or a second PMOS transistor 351.

The first feedback resistor Rf1 and the second feedback resistor Rf2 are connected in series between the output node NO and the ground voltage VSS. The first feedback resistor Rf1 is connected between the output node NO and a feedback node FN and the second feedback resistor Rf2 is connected between the feedback node FN and the ground voltage VSS.

The first feedback resistor Rf1 and the second feedback resistor Rf2 divide the output voltage VOUT by a ratio of Rf2/(Rf1+Rf2) to generate the feedback voltage VFB at the feedback node FN and provide the feedback voltage VFB to the error amplifier 100. The feedback capacitor Cf and the second PMOS transistor 351 are connected between the output node NO and the feedback node FN in parallel with the first feedback resistor Rf1. The feedback capacitor Cf and the second PMOS transistor 351 are connected in series between the output node NO and the feedback node FN. The feedback capacitor Cf has a first terminal connected to the output node NO and a second terminal connected to the second PMOS transistor 351.

The second PMOS transistor 351 has a gate receiving the control voltage VM, is selectively turned-on/turned-off in response to the control voltage VM and selectively connects the feedback capacitor Cf between the output node NO and the feedback node FN. When the second PMOS transistor 351 is turned-on, the second terminal of the feedback capacitor Cf is connected to the feedback node FN. When the second PMOS transistor 351 is turned-on, the second terminal of the feedback capacitor Cf is floated.

When the load current IL in FIG. 1 decreases, the mirror current IM in FIG. 4 decreases, and the control voltage VM decreases in response to decrease of the mirror current IM. The second PMOS transistor 351 is turned-on in response to the decrease of the control voltage VM. When the second PMOS transistor 351 is turned-on in response to the increase of the control voltage VM, the second terminal of the feedback capacitor Cf is connected to the feedback node FN and a capacitance of the feedback capacitor Cf is associated with a zero of the feedback circuit 350.

When the load current IL in FIG. 1 increases, the mirror current IM in FIG. 4 increases, and the control voltage VM increases in response to increase of the mirror current IM. The second PMOS transistor 351 is turned-off in response to the increase of the control voltage VM. When the second PMOS transistor 351 is turned-off in response to the increase of the control voltage VM, the second terminal of the feedback capacitor Cf is not connected to the feedback node FN. Therefore, a capacitance of the feedback capacitor Cf is not associated with a zero of the feedback circuit 350 and the zero of the feedback circuit 350 may be cancelled.

Figure 6:
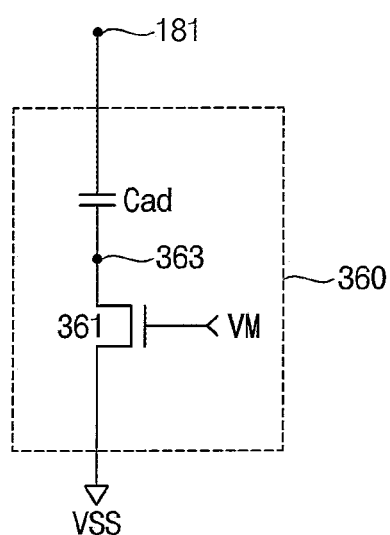
FIG. 6 is a circuit diagram illustrating an example of the APAC in the LDO regulator of FIG. 1 according to example embodiments.

FIG. 6 is a circuit diagram illustrating an example of the APAC in the LDO regulator of FIG. 1 according to example embodiments.

Referring to FIG. 6, the APAC 360 may include an adjusting capacitor Cad and/or an NMOS transistor 361.

The adjusting capacitor Cad may be coupled between the first intermediate node 181 and a first node 363. The adjusting capacitor Cad may have a first terminal coupled to the first intermediate node 181 and a second terminal coupled to the first node 363. The NMOS transistor 361 may be connected between the first node 363 and the ground voltage VSS, and may have a gate receiving the control voltage VM. The NMOS transistor 361 may be selectively turned-on/turned-off in response to the control voltage VM to selectively connect the adjusting capacitor Cad between the first intermediate node 181 and the ground voltage VSS.

When the load current IL in FIG. 1 decreases, the mirror current IM in FIG. 4 decreases, and the control voltage VM decreases in response to decrease of the mirror current IM. The NMOS transistor 361 is turned-off in response to the decrease of the control voltage VM. When the NMOS transistor 361 is turned-off, the second terminal of the adjusting capacitor Cad is not connected to the ground voltage VSS, a capacitance of the adjusting capacitor Cad is not associated with a pole of an output of the error amplifier 100.

When the load current IL in FIG. 1 increases, the mirror current IM in FIG. 4 increases, and the control voltage VM increases in response to increase of the mirror current IM. The NMOS transistor 361 is turned-on in response to the increase of the control voltage VM. When the NMOS transistor 361 is turned-on, the second terminal of the adjusting capacitor Cad is connected to the ground voltage VSS, and the adjusting capacitor Cad is coupled between the first intermediate node 181 and the ground voltage VSS.

When the adjusting capacitor Cad is coupled between the first intermediate node 181 and the ground voltage VSS, the capacitance of the adjusting capacitor Cad is associated with a pole of an output of the error amplifier 100. When the capacitance of the adjusting capacitor Cad is associated with a pole of an output of the error amplifier 100, a frequency of the pole of the output of the error amplifier 100 is smaller than a frequency of the pole of the output of the error amplifier 100 when the adjusting capacitor Cad is not coupled between the first intermediate node 181 and the ground voltage VSS.

Figure 7:
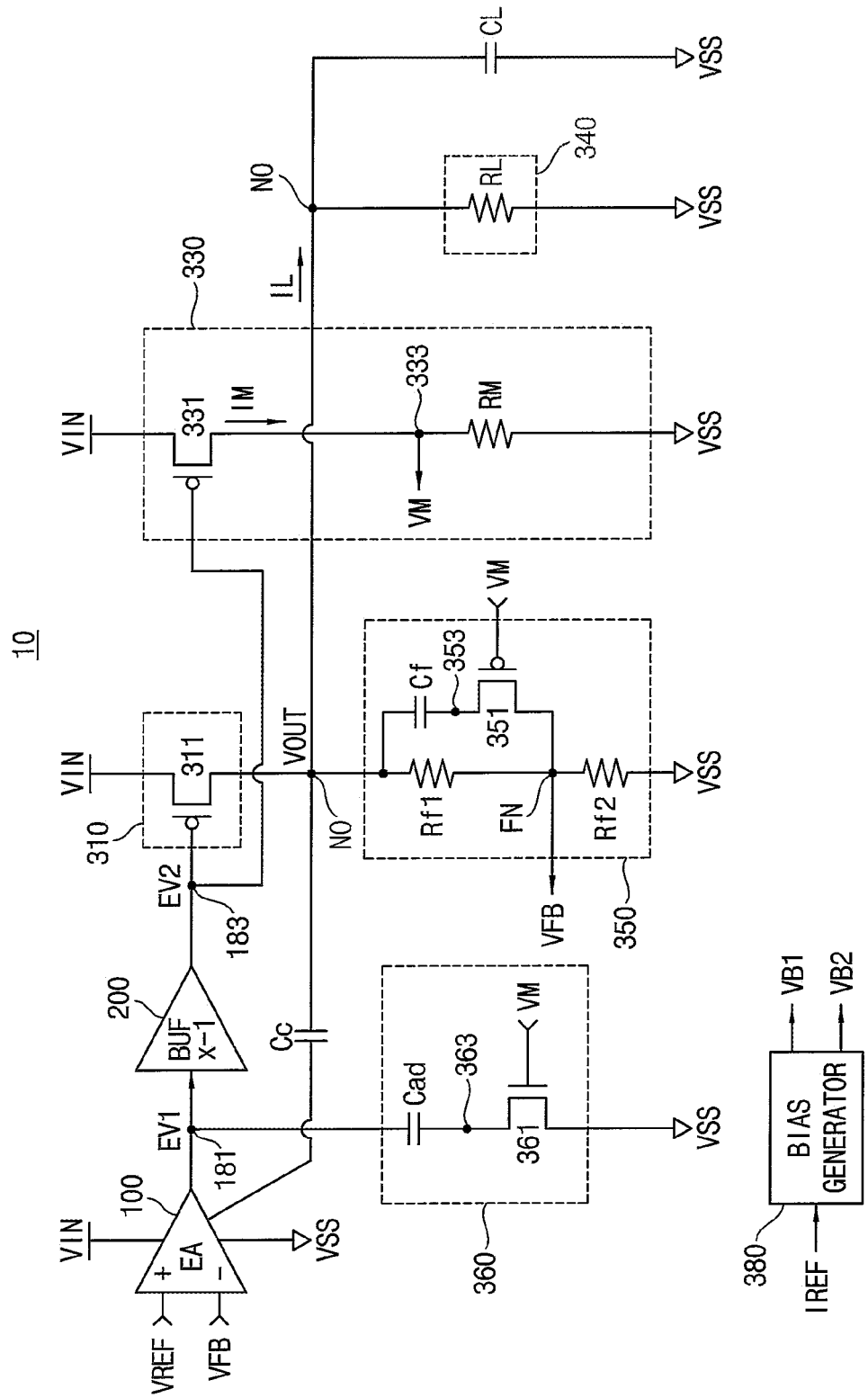
FIG. 7 is a circuit diagram illustrating an overall architecture of the LDO regulator according to example embodiments.

FIG. 7 is a circuit diagram illustrating an overall architecture of the LDO regulator according to example embodiments.

Figure 8:
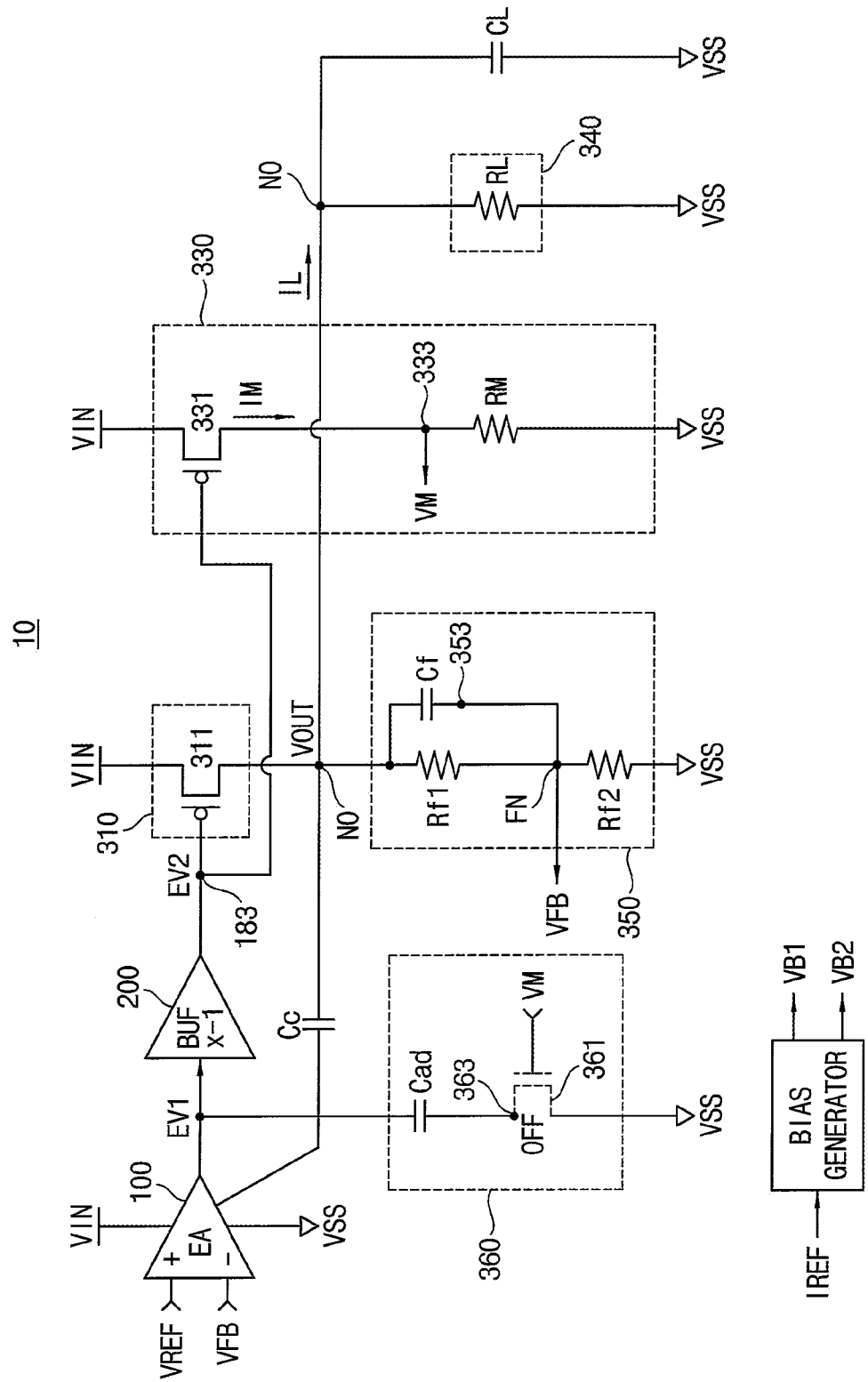
FIG. 8 illustrates an example of the LDO regulator of FIG. 7 when a load current consumed by the load is reduced.

FIG. 8 illustrates an example of the LDO regulator of FIG. 7 when a load current consumed by the load is reduced.

Referring to FIGS. 1, 7 and 8, when the load current IL flowing from the output node NO to the load 340 is reduced, e.g., when the load 340 is a light load, the mirror current IM decreases, and the control voltage VM decreases in response to decrease of the mirror current IM. The second PMOS transistor 351 is turned-on in response to the decrease of the control voltage VM, and the capacitance of the feedback capacitor Cf is associated with a zero of the feedback circuit 350.

In addition, the NMOS transistor 361 in the APAC 360 is turned-off in response to the decrease of the control voltage VM. When the NMOS transistor 361 is turned-off, the second terminal of the adjusting capacitor Cad is not connected to the ground voltage VSS, a capacitance of the adjusting capacitor Cad is not associated with the pole of an output of the error amplifier 100.

Figure 9:
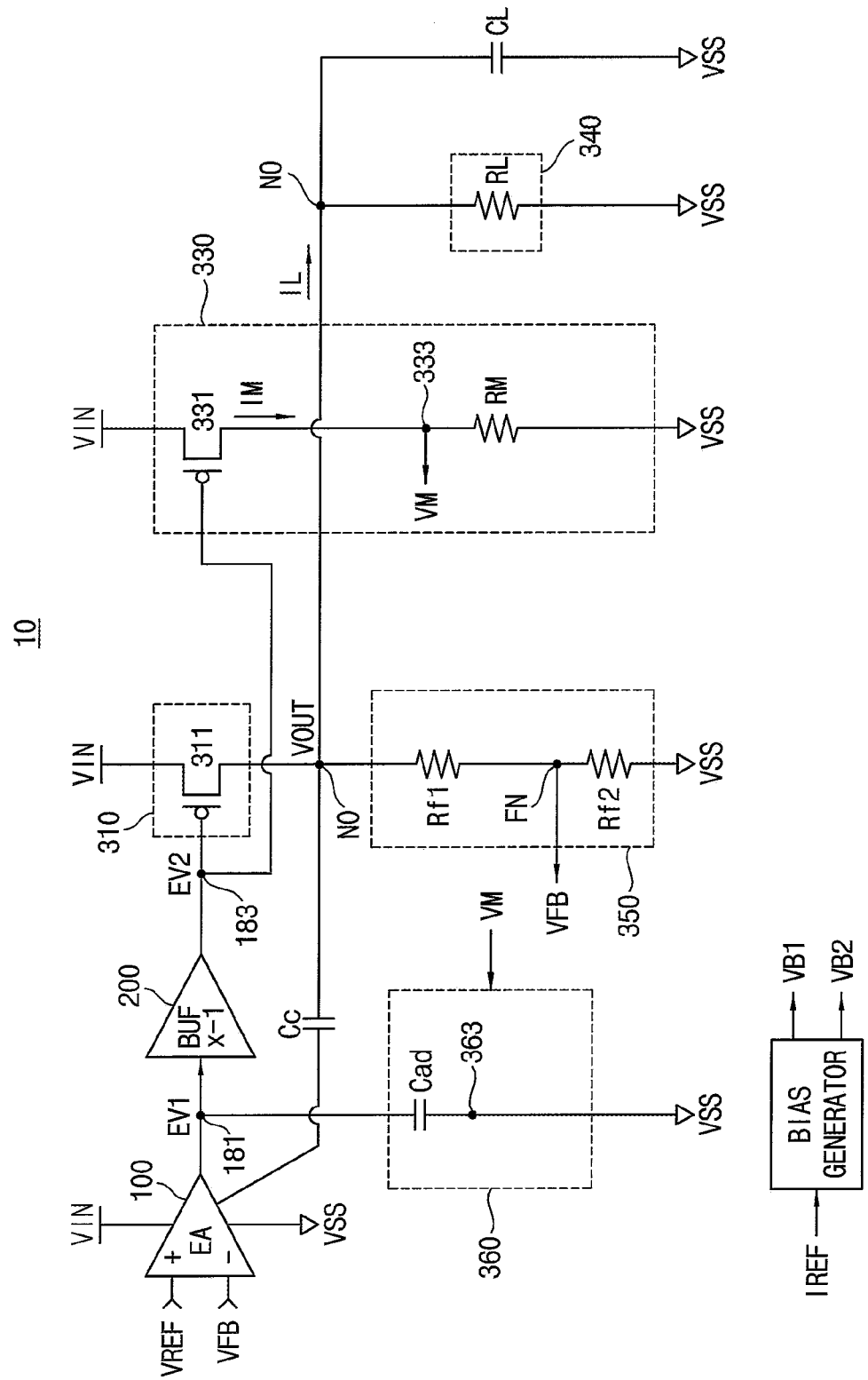
FIG. 9 illustrates an example of the LDO regulator of FIG. 7 when a load current consumed by the load increases.

FIG. 9 illustrates an example of the LDO regulator of FIG. 7 when a load current consumed by the load increases.

Referring to FIGS. 1, 7 and 9, when the load current IL flowing from the output node NO to the load 340 is increased, e.g., when the load 340 is a heavy load, the mirror current IM increases, and the control voltage VM increases in response to increase of the mirror current IM. The second PMOS transistor 351 is turned-off in response to the increase of the control voltage VM, the feedback capacitor Cf is not coupled between the output node NO and the feedback node FN and the capacitance of the feedback capacitor Cf is not associated with a zero of the feedback circuit 350. Therefore, the zero of the feedback circuit 350 may be cancelled.

In addition, the NMOS transistor 361 in the APAC 360 is turned-on in response to the decrease of the control voltage VM. When the NMOS transistor 361 is turned-on, the second terminal of the adjusting capacitor Cad is coupled between the first intermediate node 181 and the ground voltage VSS, the capacitance of the adjusting capacitor Cad is associated with the frequency of the pole of the output of the error amplifier 100. When the capacitance of the adjusting capacitor Cad is associated with the frequency of the pole of the output of the error amplifier 100 is smaller than a frequency of the pole of the output of the error amplifier 100 when the adjusting capacitor Cad is not coupled between the first intermediate node 181 and the ground voltage VSS.

Figure 10:
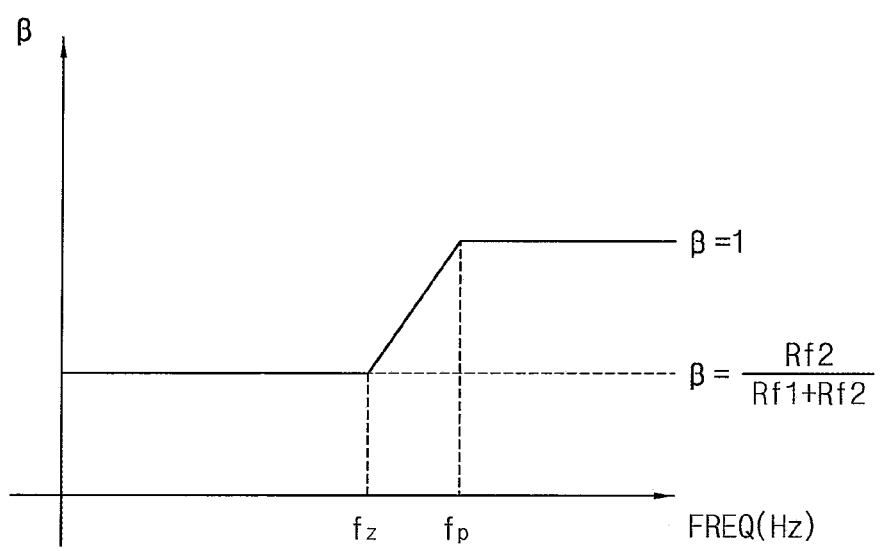
FIG. 10 is a graph for explaining a feedback factor associated with the feedback capacitor in the feedback circuit in FIG. 7.

FIG. 10 is a graph for explaining a feedback factor associated with the feedback capacitor in the feedback circuit in FIG. 7.

Referring to FIGS. 7 and 10, when the feedback capacitor Cf is not coupled between the output node NO and the feedback node FN, a feedback factor β corresponds to Rf2/(Rf1+Rf2) and the feedback factor β has a constant value. When the feedback capacitor Cf is coupled between the output node NO and the feedback node FN, a slope of the feedback factor β depends on a frequency FREQ, the feedback factor β has a zero at a frequency $f_z$ and has a pole at a frequency $f_z$.

In FIG. 10, a horizontal axis represents frequency (Hz) and a vertical axis represents the feedback factor β.

Therefore, the LDO regulator 10 in FIG. 7 may adjust the feedback capacitor Cf being associated with a zero of the feedback circuit 350 by adjusting a level of the control voltage VM based on a magnitude of the load current IL automatically.

Figure 11:
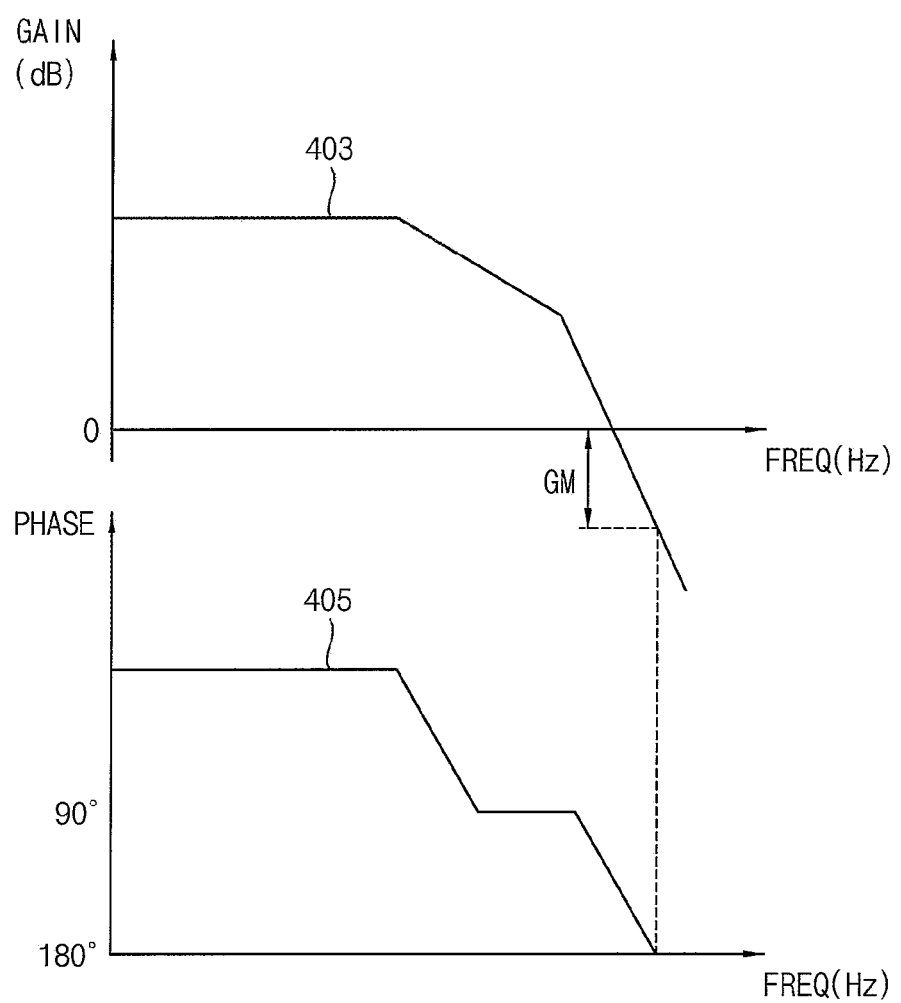
FIG. 11 is graphs for explaining a gain margin of the LDO regulator of FIG. 7.

FIG. 11 is graphs for explaining a gain margin of the LDO regulator of FIG. 7.

In FIG. 11, a horizontal axis represents frequency (Hz) and a vertical axis represents a gain of a transfer function in a graph 403. In addition, a horizontal axis represents frequency (Hz) and a vertical axis represents a phase of the transfer function in a graph 405.

Referring to FIG. 11, a gain margin GM may be defined as a difference between gains at 0 dB in the graph 403 and at a frequency at which a phase in the graph 405 has shifted 180 degree. When a frequency at which the gain is 0 dB is referred to as a unit gain frequency, the gain margin GM may increase as the unit gain frequency decreases. When the gain margin GM increases, poles having higher frequencies may be located in a region at which frequencies are greater than the unit gain frequency and stability of the LDO regulator 10 may increase.

Figure 12:
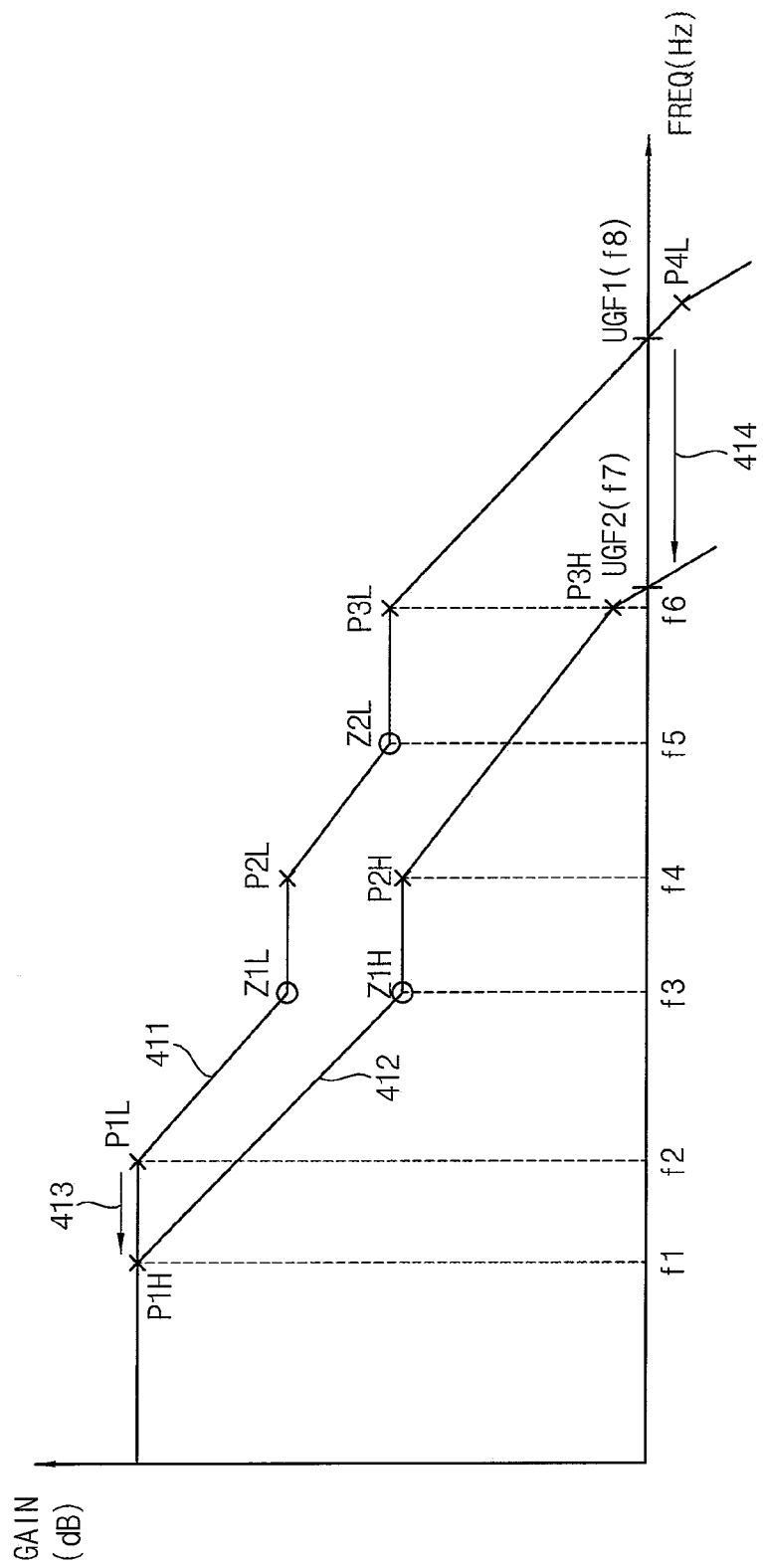
FIG. 12 illustrates graphs associated with a transfer function of the LDO regulator of FIG. 7 according to example embodiments.

FIG. 12 illustrates graphs associated with a transfer function of the LDO regulator of FIG. 7 according to example embodiments.

In FIG. 12, a reference numeral 411 indicates a transfer function of the LDO regulator 10 in a light load case when the load current IL flowing into the load 340 is small and a reference numeral 412 indicates the transfer function of the LDO regulator 10 in a heavy load case when the load current IL flowing into the load 340 is great.

As described with reference to FIGS. 4 through 8, the mirror current IM decreases, and the control voltage VM decreases in response to decrease of the mirror current IM in the light load case. The second PMOS transistor 351 is turned-on in response to the decrease of the control voltage VM and the feedback capacitor Cf is coupled between the output node NO and the feedback node FN. In addition, the NMOS transistor 361 is turned-off in response to the decrease of the control voltage VM. When the NMOS transistor 361 is turned-off, the adjusting capacitor Cad is not connected between the first intermediate node 181 and the ground voltage VSS. Therefore, the transfer function of the LDO regulator 10 in the light load case may be represented following equation 1.

$$H(s) = g_{m_{N1}} g_{m_{PTR}} R_{EA} R_{OUT} \left( \frac{R_{F2}}{R_{F1} + R_{F2}} \right) \times \qquad \text{[equation 1]}$$

$$\frac{\left(1 + s \dfrac{C_c}{g_{m_{N2'}}}\right)(1 + sR_{F1}C_F)}{(1 + sR_L C_L)(1 + sR_{EA} C_{EA})}$$
$$(1 + sR_{INT} C_{PTR})(1 + s(R_{F1} \| R_{F2}) C_F)$$

In equation 1, $g_{m_{N1}}$ indicates a transconductance of the error amplifier 100, $g_{m_{PTR}}$ indicates a transconductance of the power transistor 311, REA represents an output impedance of the error amplifier 100, $C_{EA}$ represents an output capacitance of the error amplifier 100, $1/g_{m_{N1'}}$ indicates an impedance the output node NO connected to the compensation capacitor Cc, and $R_{INT}$ indicates an output impedance of the buffer 200.

Referring back to FIG. 12, a first pole P1L associated with an output of the error amplifier 100 has a second frequency f2, a first zero Z1L of the third node N13 of the error amplifier 100, coupled to the compensation capacitor Cc, has a third frequency f3, a second pole P2L associated with the power transistor 311 has a fourth frequency f4, a second zero Z2L associated with the feedback circuit 350 has a fifth frequency f5, a third pole P3L associated with the output node NO has a sixth frequency f6, and a fourth pole P4L associated with the feedback circuit 350 has a sixth frequency f6 greater than a unit gain frequency UGF1. The unit gain frequency UGF1 whose gain is 0 dB has an eighth frequency f8.

That is, the first pole P1L associated with an output of the error amplifier 100 has a second frequency f2 and the second zero Z2L associated with the feedback circuit 350 has a fifth frequency f5 in the light load case, and the stability may increase in the light load case.

As described with reference to FIGS. 4 through 7 and 9, the mirror current IM increases, and the control voltage VM increases in response to decrease of the mirror current IM in the heavy load case. The second PMOS transistor 351 is turned-off in response to the increase of the control voltage VM and the feedback capacitor Cf is not coupled between the output node NO and the feedback node FN. In addition, the NMOS transistor 361 is turned-on in response to the increase of the control voltage VM. When the NMOS transistor 361 is turned-on, the adjusting capacitor Cad is coupled between the first intermediate node 181 and the ground voltage VSS. Therefore, the transfer function of the LDO regulator 10 in the heavy load case may be represented following equation 2.

$$H(s) = g_{m_{N1}} g_{m_{PTR}} R_{EA} R_{OUT} \left( \frac{R_{F2}}{R_{F1} + R_{F2}} \right) \times \frac{\left(1 + s \frac{C_c}{g_{m_{N2'}}}\right)}{(1 + sR_L C_L)(1 + sR_{EA}(C_{EA} + C_{ad}))} \quad \text{[equation 2]}$$
$$(1 + sR_{INT} C_{PTR})(1 + s(R_{F1} \| R_{F2}) C_F)$$

When the equation 2 is compared with the equation 1, the second zero Z2L associated with the feedback circuit 350 is cancelled, and a first pole P1H associated with the output of the error amplifier 100 is associated with the adjusting capacitor Cad.

Therefore, the first pole P1H associated with the output of the error amplifier 100 has a first frequency f1, a first zero Z1H of the third node N13 of the error amplifier 100, has a third frequency f3, a third pole P3H associated with the output node NO has a sixth frequency f6. A unit gain frequency UGF2 whose gain is 0 dB has fifth frequency f7.

That is, in the heavy load case, the first pole P1H associated with the output of the error amplifier 100 has a first frequency f1 smaller than a second frequency f2, the second zero Z2L associated with the feedback circuit 350 is cancelled and unit gain frequency UGF2 has a seventh frequency f7 smaller than the eighth frequency f8 of the unit gain frequency UGF1. That is, the LDO regulator 10 may secure stability by cancelling the second zero associated with the feedback circuit in the heavy load case and may secure enough gain margin by decreasing the frequency of the first pole P1H in the heavy load case smaller than the frequency of the first pole P1L in the light load case. In addition, stability margin may be secured by moving the zero of the error amplifier 100 in a low frequency region due to the adjusting capacitor Cad and a turn-on resistance of the NMOS transistor 631 and adding zero due to the feedback circuit 350 in the middle load case.

Accordingly, the first pole P1L in the light load case moves to the first pole P1H in the heavy load case as a reference numeral 413 indicates and the unit gain frequency UGF1 in the light load case moves the unit gain frequency UGF2 in the heavy load case as a reference numeral 414 indicates.

Therefore, the LDO regulator 10 may operate stably in various load cases and may provide the output voltage VOUT.

Figure 13:
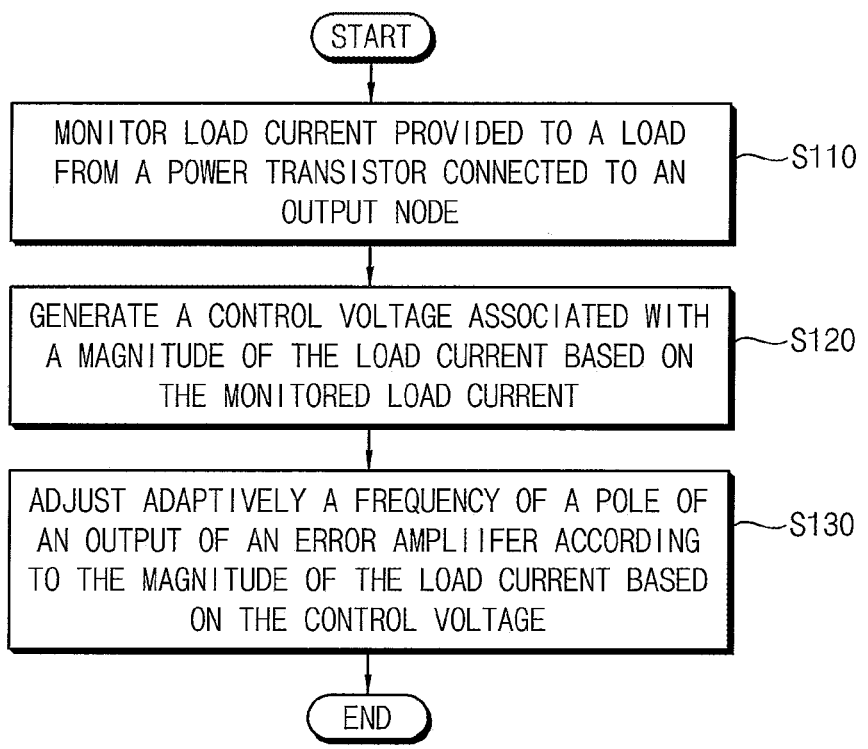
FIG. 13 is flow chart illustrating a method of operating an LDO regulator according to example embodiments.

FIG. 13 is flow chart illustrating a method of operating an LDO regulator according to example embodiments.

Referring to FIGS. 1 through 13, in a method of operating an LDO regulator 10, which includes an error amplifier 100 that amplifies a difference between a reference voltage VREF and a feedback voltage VF to output a first error voltage EV1, a buffer 200 that is connected to an output terminal of the error amplifier 100 at an first intermediate node 181 and, buffers the first error voltage EV1 and output a second error voltage EV2, a power transistor 311 that receives the second error voltage EV2 at a second intermediate node 183 and a monitoring circuit 330 that is connected to the second intermediate node 183 in parallel with the power transistor 311, the monitoring circuit 330 monitors a load current IL which is provided to a load from the power transistor 311 (operation S110).

The monitoring circuit 330 generates a control voltage VM associated with a magnitude of the load current IL based on the monitored load current (operation S120).

An APAC 360, connected between the first intermediate node 181 and a ground voltage VSS may adaptively adjust a frequency of a pole of the output of the error amplifier 100 based on the control voltage VM (operation S130).

The APAC 360 may include an adjusting capacitor Cad and an NMOS transistor 361 connected in series between the first intermediate node 181 and the ground voltage VSS. The NMOS transistor 361 may be selectively turned-on/turned-off in response to the control voltage VM to selectively connect the adjusting capacitor Cad between the first intermediate node 181 and the ground voltage VSS. When the adjusting capacitor Cad is coupled between the first intermediate node 181 and the ground voltage VSS, the frequency of the pole of the output of the error amplifier 100 is smaller than a frequency of the pole of the output of the error amplifier 100 when the adjusting capacitor Cad is not coupled between the first intermediate node 181 and the ground voltage VSS.

Figure 14:
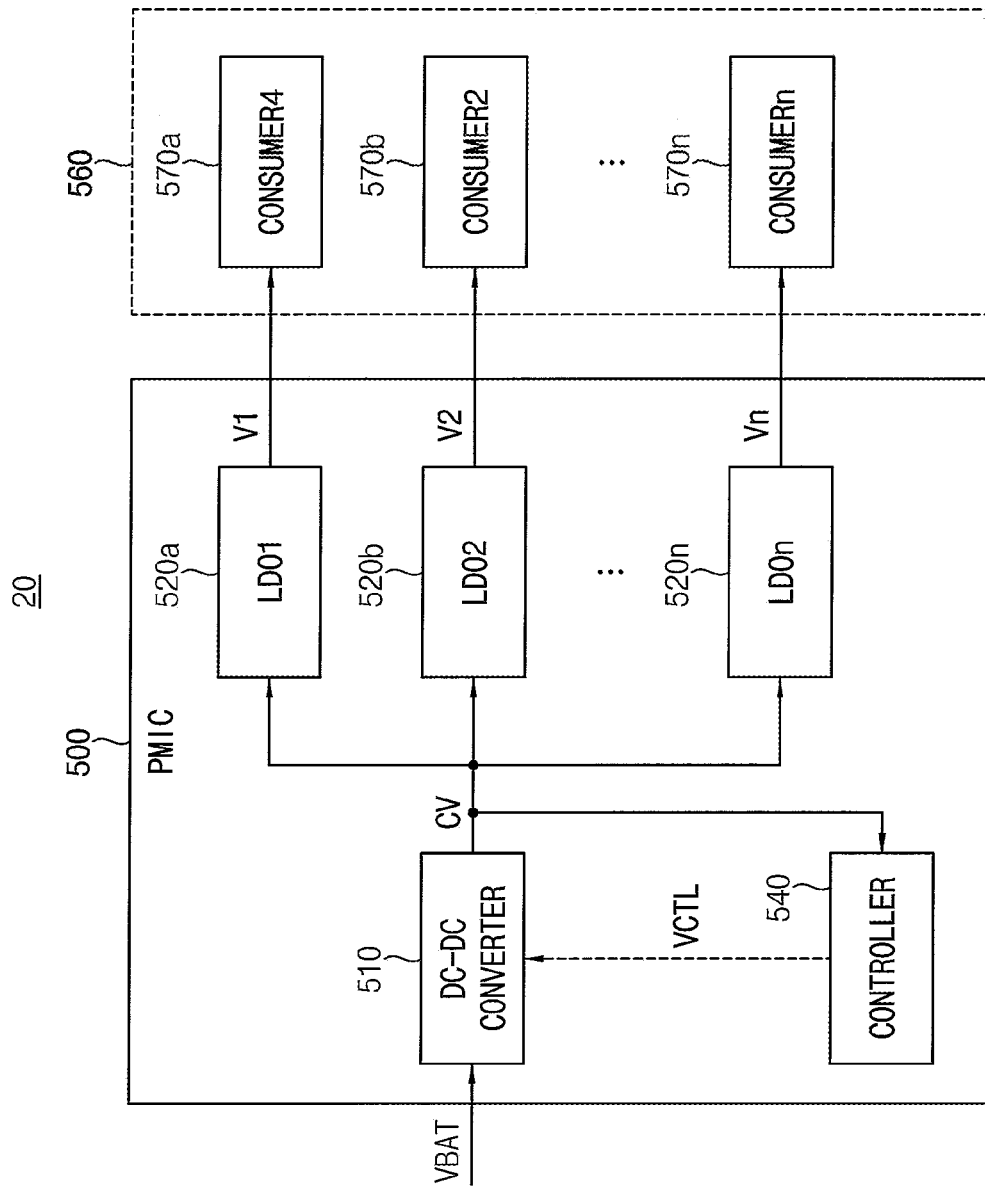
FIG. 14 is a block diagram illustrating an example of an electronic device including a power management integrated circuit (PMIC) according to example embodiments.

FIG. 14 is a block diagram illustrating an example of an electronic device including a power management integrated circuit (PMIC) according to example embodiments.

Referring to FIG. 14, an electronic device 20 may include a PMIC 5000 and a consumer group 560. The consumer group 560 may include a plurality of consumers 570a through 570n. In some example embodiments, the consumers 570a through 570n may be chips, modules, or other circuits in the electronic device 20. For example, the consumers 570a through 570n may be modems, application processors, memories, displays, and/or other circuits. The consumers 570a through 570n may also include operation blocks, functional blocks, or IP blocks in the electronic device 230. Examples of these include multimedia blocks, memory controllers, or other logic in the application processor. The consumers 570a through 570n may be referred to, for example, as consumption blocks or loads.

The PMIC 500 may receive a battery voltage VBAT from a source (e.g., an external source) and generate a plurality of output voltages V1 through Vn for driving the consumers 570a through 570n. The PMIC 500 may include at least one first regulator 510, a plurality of second regulators 520a through 520n, and a controller 140. The at least one first regulator 510 and the second regulators 520a through 520n may be connected to each other, for example, in a multistep structure.

The first regulator 510 may receive the battery voltage VBAT from an external voltage source, for example, a battery, and generate a conversion voltage CV from the received battery voltage VBAT. The first regulator 510 may adjust switching timing associated with the conversion voltage CV based on a voltage control signal VCTL.

In some example embodiments, when at least one of the consumers 570a through 570n is powered off (and thus at least one of the second regulators 520a through 520n is powered off), the conversion voltage CV may be reduced. In some example embodiments, although all the consumers 570a through 570n are powered on, the conversion voltage CV may also be changed according to the operation states of the consumers 570a through 570n. For example, when one of the consumers 570a through 570n is in a standby or sleep state (and thus an output current of a corresponding one of the consumers 570a through 570n is reduced), the conversion voltage CV may be reduced.

In some example embodiments, the first regulator 510 may be a switching regulator that uses an energy storage component (e.g., a capacitor and an inductor) and an output stage to generate the conversion voltage CV. For example, the first regulator 510 may be a DC-DC converter. The first regulator 510 is referred to as the DC-DC converter below. The DC-DC converter 510 may be a step-up converter (for example, a boost converter) that coverts the low battery voltage VBAT to the high conversion voltage CV, or a step-down converter (for example, a buck converter) that converts the high battery voltage VBAT to the low conversion voltage CV.

The second regulators 520a through 520n may be commonly connected to the DC-DC converter 510, receive the conversion voltage CV from the DC-DC converter 110, and generate a plurality of output voltages V1 through Vn from the conversion voltage CV. The output voltages V1 through Vn may be different from each other and, for example, may be less than the conversion voltage CV. The second regulators 520a through 520n may be, for example, linear regulators, e.g., LDO regulators. For illustrative purposes, the second regulators 520a through 520n are referred to as the LDO regulators below.

The DC-DC converter 510 may have a substantially uniform efficiency irrespective of input and output voltages. Each of the LDO regulators 520a through 520n may have a variable efficiency with respect to the input and output voltages. Efficiency of each of the LDO regulators 520a through 520n may correspond to a ratio of each of the output voltages V1 through Vn with respect to the conversion voltage VC. For example, the efficiency of the LDO regulator 520a may be a ratio (e.g., V1/Vout) of the output voltage V1 with respect to the conversion voltage CV. Thus, a reduction in the difference between the input and output voltages of the LDO regulators 520a through 520n may be performed to improve the efficiency of each of the LDO regulators 520a through 520n.

When the difference between the input and output voltages of LDO regulators 520a through 520n is large (e.g., above a predetermined or alternatively, desired level), the conversion efficiency of the entire PMIC 500 may be improved when the DC-DC converter 510 is in front of the LDO regulators 520a through 520n and an output of the DC-DC converter 510 is used as an input of each of the LDO regulators 520a through 520n. Thus, for example, when the output voltages V1 through Vn of the LDO regulators 520a through 520n are different from each other, the conversion efficiency of the PMIC 500 may be improved when DC-DC converters are respectively arranged in front of the LDO regulators 520a through 520n.

In some example embodiments, the LDO regulators 520a through 520n may be grouped, and the DC-DC converter 510 may be shared by the grouped LDO regulators 520a through 520n, in order to reduce the area and manufacturing costs of the PMIC 500. In some example embodiments, the difference between the input and output voltages of the LDO regulators 520a through 520n may be large (e.g., above a predetermined or alternatively, desired level) compared when the LDO regulators 520a through 520n and DC-DC converters are respectively arranged. Thus the conversion efficiency of the PMIC 500 may be reduced.

However, according to the present example embodiments, the first regulator 510 may adjust the switching timing associated with the conversion voltage CV based on the voltage control signal VCTL, thereby improving the conversion efficiency of the PMIC 500.

The controller 540 may generate the voltage control signal VCTL for adjusting the switching timing associated with the conversion voltage CV output from the DC-DC converter 510. The voltage control signal VCTL may be provided to the DC-DC converter 510.

Each of the LDO regulators 520a through 520n may employ the LDO regulator 10 of FIG. 7. Therefore, each of the LDO regulators 520a through 520n may include an error amplifier, a buffer, a power transistor, a feedback circuit, a monitoring circuit and/or an APAC.

The monitoring circuit may generate a control voltage by monitoring a load current provided to a load from an output node, the APAC may adjust a frequency of a pole of an output of the error amplifier by selectively coupling an adjusting capacitor between an output terminal of the error amplifier and a ground voltage in response to the control voltage.

Figure 15:
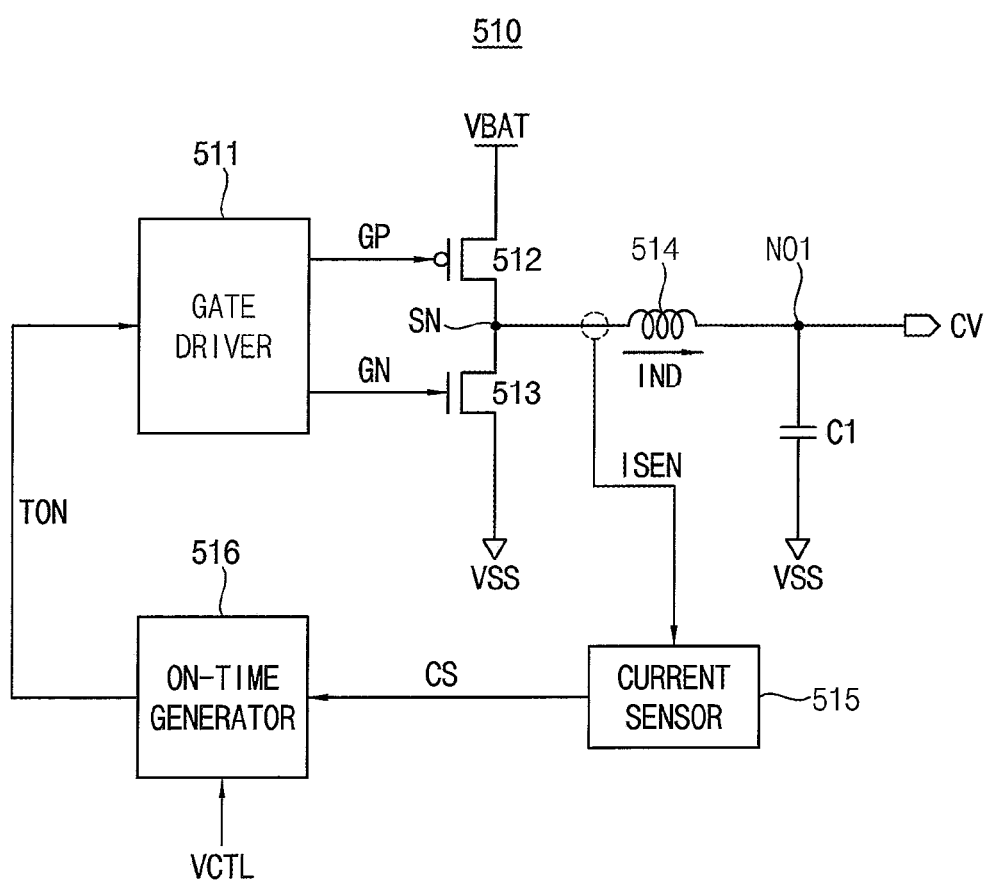
FIG. 15 is a circuit diagram illustrating an example of the DC-DC converter in FIG. 14 according to example embodiments.

FIG. 15 is a circuit diagram illustrating an example of the DC-DC converter in FIG. 14 according to example embodiments.

Referring to FIG. 15, the DC-DC converter (the switching regulator) 510 may include a gate driver 511, a first driving transistor 512, a second driving transistor 513, an inductor 514, a capacitor C1, a current sensor 515 and/or an on-time generator 516.

The first driving transistor 512 is connected between the battery voltage VBAT and a switching node SN and has a gate receiving a first driving control signal GP1. The first driving transistor 512 may be a PMOS transistor. The second driving transistor 513 is connected between the switching node SN and the ground voltage VSS and has a gate receiving a second driving control signal GN. The second driving transistor 513 may be an NMOS transistor.

The inductor 514 is connected between the switching node SN and a first output node NO1. An inductor current IND flows from the switching node SN to the first output node NO1 and the capacitor C1 is coupled between the first output node NO1 and the ground voltage VSS. The conversion voltage CV is provided at the first output node NO1.

The current sensor 515 senses the inductor current IND flowing from the switching node SN to the first output node NO1 to generate a current signal CS based on the sensed current ISEN and provides the current signal CS to the on-time generator 516.

The on-time generator 516 generates an on-time signal TON determining on-time of the first driving transistor 512 and the second driving transistor 513 based on the current signal CS and the control voltage signal VCTL and provides the on-time signal TON to the gate driver 511. The gate driver 511 may determine activation interval of the first driving control signal GP1 and the second driving control signal GN and may provide the first driving control signal GP1 and the second driving control signal GN to the first driving transistor 512 and the second driving transistor 513, respectively.

The first driving transistor 512 and the second driving transistor 513 are turned-on/turned-off, respectively, based on the first driving control signal GP1 and the second driving control signal GN, and a magnitude of the inductor current IND may be determined thereby. The first driving transistor 512 and the second driving transistor 513 are complementarily turned-on/turned-off, based on the first driving control signal GP1 and the second driving control signal GN.

The first driving transistor 512 and the second driving transistor 513 charges the battery voltage VBAT in the inductor 514 in response to the first driving control signal GP1 and the second driving control signal GN having a first logic level to increase the level of the conversion voltage CV. The first driving transistor 512 and the second driving transistor 513 discharges the voltage charged in the inductor 514 in response to the first driving control signal GP1 and the second driving control signal GN having a second logic level to decrease the level of the conversion voltage CV.

Figure 16:
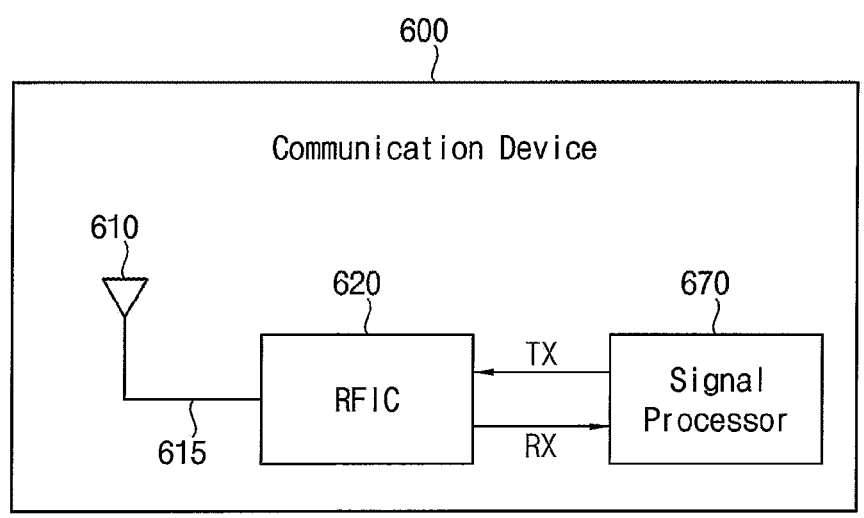
FIG. 16 is a block diagram of a communication device according to example embodiments.

FIG. 16 is a block diagram of a communication device according to example embodiments.

Referring to FIG. 16, a communication device 600 may include an antenna 610 and may communicate with another communication device in a wireless communication system by transmitting/receiving signals via the antenna 610, and may be referred to as a wireless communication device.

A wireless communication system, in which the communication device 600 communicates with a counterpart communication device, may be a wireless communication system using a cellular network such as a next generation communication system, a fifth generation (5G) wireless system, a long term evolution (LTE) system, an LTE-Advanced system, a code division multiple access (CDMA) system, a global system for mobile communications (GSM) system, etc., a wireless local area network (WLAN) system, or another arbitrary wireless communication system.

As shown in FIG. 16, the communication device 600 may include the antenna 610, a radio frequency integrated circuit (RFIC) 620, and/or a signal processor 670, and the antenna 610 and the RFIC 620 may be connected to each other via a power feed line 615.

In the current specification, the antenna 610 may be referred to as an antenna module, and a structure including the antenna 610 and the power feed line 615 may be overall referred to as an antenna module. In addition, the antenna 610, the power feed line 615, and the RFIC 620 may be overall referred to as an RF system or an RF apparatus.

The RFIC 620 may provide the antenna 610 with a signal via the power feed line 615, wherein the signal is generated by processing a transmission signal TX from the signal processor 670 in a transmission mode and may provide the signal processor 670 with a received signal RF by processing a signal transmitted from the antenna 610 via the power feed line 615 in a reception mode. For example, the RFIC 620 may include a transmitter that may include a filter, a mixer, and/or a power amplifier (PA). In addition, the RFIC 620 may include a receiver that may include a filter, a mixer, and/or a low-noise amplifier (LNA). In some example embodiments, the RFIC 620 may include a plurality of transmitters and a plurality of receivers, or may include a transceiver in which a transmitter is combined with a receiver. In some example embodiments, the RFIC 620 may include a plurality of transceivers.

The signal processor 670 may generate a transmission signal TX by processing a signal including information to be transmitted and may generate the signal including information by processing a received signal RX. For example, the signal processor 6700 may include an encoder, a modulator, and/or a digital-to-analog converter (DAC) in order to generate the transmission signal TX. In addition, the signal processor 670 may include an analog-to-digital converter (ADC), a demodulator, and/or a decoder in order to process the received signal RX. The signal processor 670 may generate a control signal for controlling the RFIC 620. The signal processor 300 may set a transmission mode or a reception mode, or adjust electric power and gains of elements included in the RFIC 620 via the control signal.

In some example embodiments, the signal processor 670 may include one or more cores, and a memory that stores instructions executed by the one or more cores, and at least a part of the signal processor 670 may include a software block stored in the memory. In some example embodiments, the signal processor 670 may include a logic circuit designed by logic synthesis, and at least a part of the signal processor 670 may include a hardware block implemented as a logic circuit.

The wireless communication system may regulate a high spectrum band for a large data transmission amount. For example, a 5G cellular system (or 5G wireless system) officially designated as IMT-2020 by the International telecommunication union (ITU) regulates millimeter waves (mmWave) of 24 GHz or greater.

The antenna 610 according to example embodiments may be configured to transmit/receive (or radiate electromagnetic waves in an RF band) signals in the RF band that is used in data transmission of mmWave, and moreover the antenna 610 may be configured to transmit/receive signals (or radiate electromagnetic waves in a low frequency band) in a low frequency band that is relatively low as compared with the RF band. The antenna 610 may be a multi-band antenna capable of supporting RF signal transmission/reception in at least two frequency bands. In addition, the antenna 610 may be configured to perform multi-polarized radiation of the electromagnetic waves, in addition to the support of multi-band.

Figure 17:
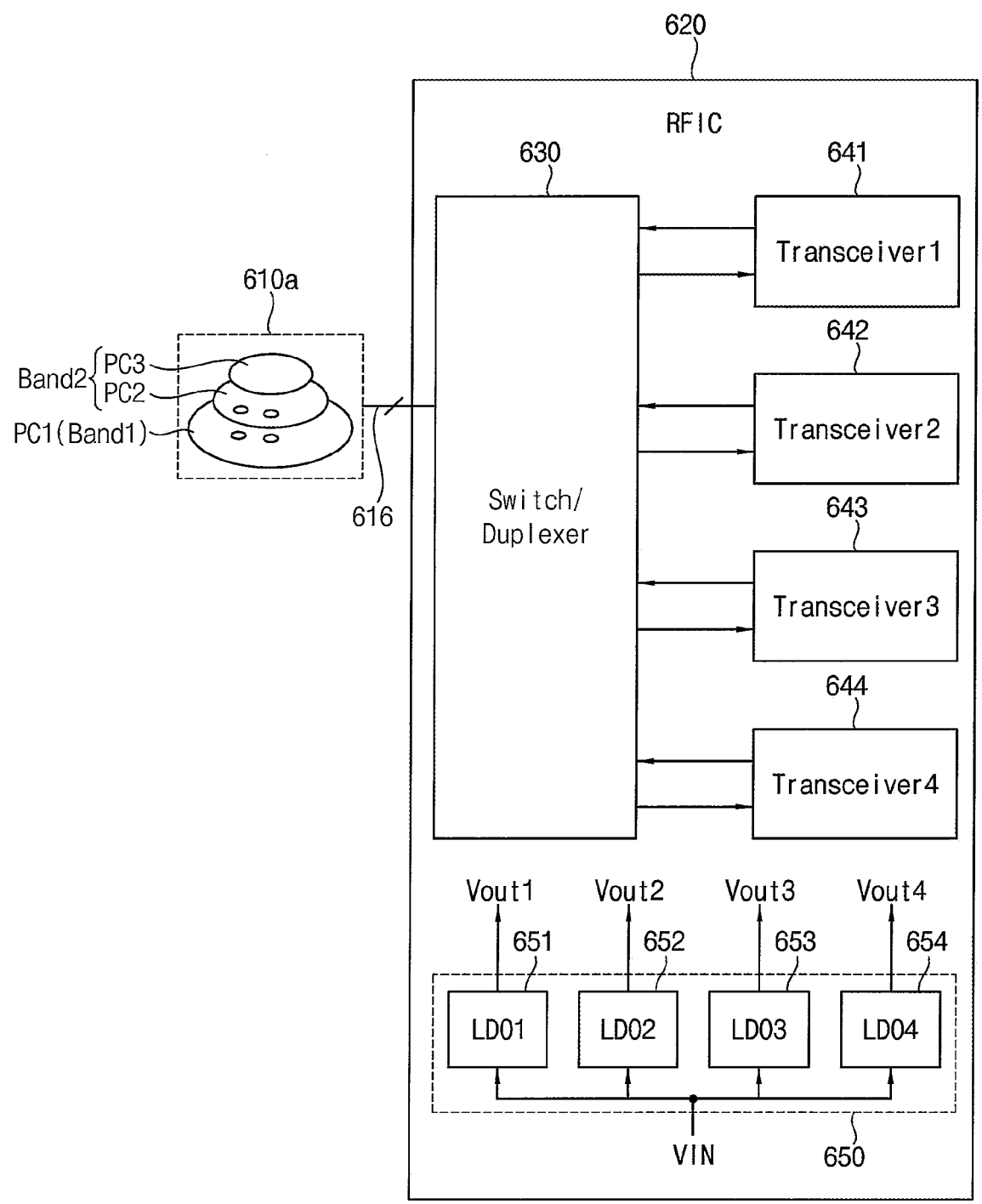
FIG. 17 is a block diagram of an antenna and an RFIC in FIG. 16 according to example embodiments.

FIG. 17 is a block diagram of an antenna and an RFIC in FIG. 16 according to example embodiments.

FIG. 17 shows an antenna 610 including two antenna patches of dual-fed, dual-polarization, and a 3-stack structure, and the RFIC 620 including first to fourth transceivers 641 to 644.

The RFIC 620 may be connected to the antenna 610 via four power feed lines corresponding to four ports of the antenna 610. For example, an antenna module including the antenna 610 and power feed lines 616 may be disposed on the RFIC 620 and at least one connection may be formed on an upper surface of the RFIC 620 and a lower surface of the antenna module. The antenna 610 may receive differential signals from the RFIC 620 via the four power feed lines 616 respectively connected to the four power feed points in a first antenna patch PC1 and a second antenna patch PC2. To this end, a pair of transceivers included in the RFIC 620 may generate one differential signal, and accordingly, four transceivers 641 to 644 may generate two differential signals.

A switch/duplexer 630 may connect/disconnect output terminals or input terminals of the four transceivers, that is, the first to fourth transceivers 641 to 644 to/from the four power feed lines 616, according to a transmission mode or a reception mode. According to the configuration shown in FIG. 17, in some example embodiments, the first transceiver 641 and the second transceiver 642 may be connected to the first antenna patch PC1 via the switch/duplexer 630 to perform signal transmission/reception in the first frequency band Band1, and the third transceiver 643 and the fourth transceiver 644 may be connected to the second antenna patch PC2 and the third antenna patch PC3 via the switch/duplexer 630 to perform the signal transmission/reception in the second frequency band Band2.

A PMIC 650 may include first through fourth LDO regulators 651~654. The first through fourth LDO regulators 651-654 may regulate an input voltage VIN to generate output voltages Vout1~Vout4, respectively and may provide the output voltages Vout1~Vout4 to respective one of the first through fourth LDO regulators 651~654.

Each of the first through fourth LDO regulators 651~654 may employ the LDO regulator 10 of FIG. 7. Therefore, each of the first through fourth LDO regulators 651~654 may include an error amplifier, a buffer, a power transistor, a feedback circuit, a monitoring circuit and/or an APAC. The monitoring circuit may generate a control voltage by monitoring a load current provided to a load from an output node, the APAC may adjust a frequency of a pole of an output of the error amplifier by selectively coupling an adjusting capacitor between an output terminal of the error amplifier and a ground voltage in response to the control voltage.

Figure 18:
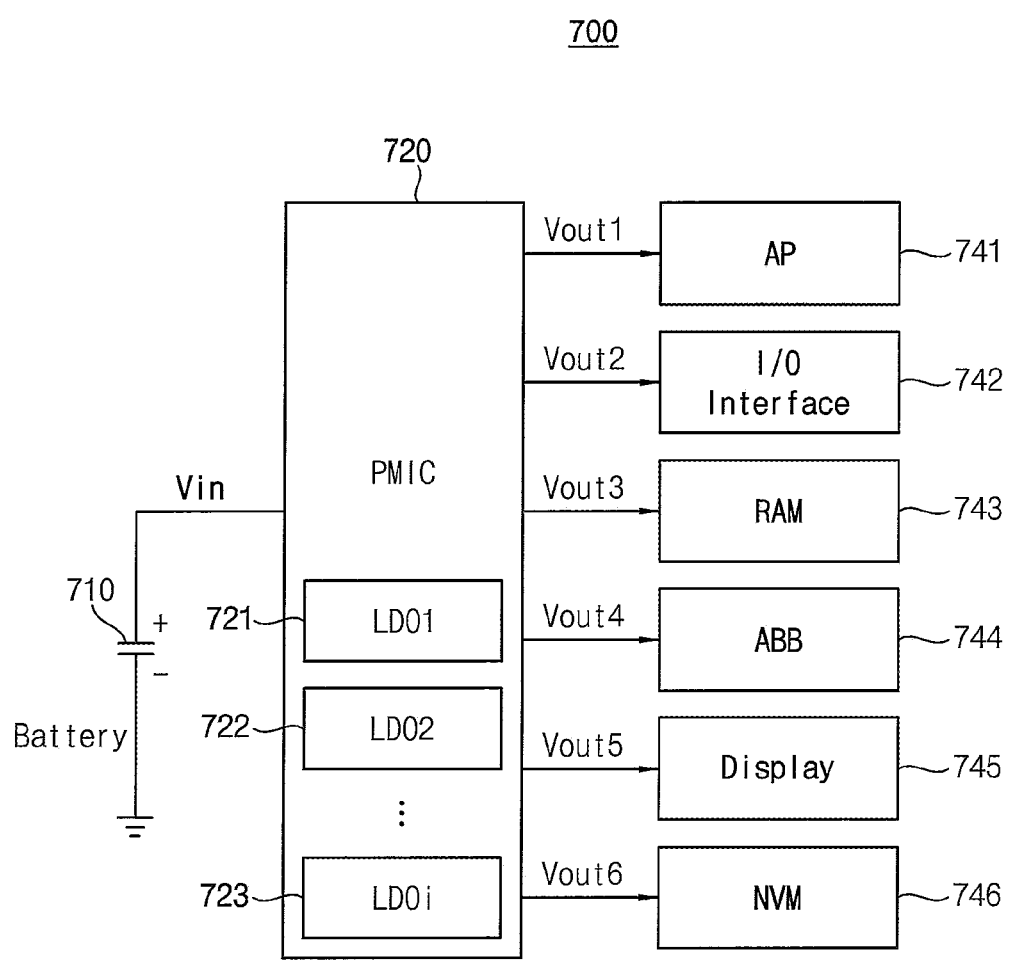
FIG. 18 is a block diagram briefly illustrating a mobile device according to example embodiments.

FIG. 18 is a block diagram briefly illustrating a mobile device according to example embodiments.

Referring to FIG. 18, a mobile device 700 may include a battery 710, a PMIC 720, an application processor (AP) 741, an input/output interface unit (or input/output interface) 742, a random access memory (RAM) 743, an analog baseband chipset (ABB) 744, a display device 745 and/or a nonvolatile memory 746.

The PMIC 720 transforms an input voltage VIN supplied from the battery 710 into output voltage Vout1 to Vout6 having various levels and provides the output voltage Vout1 to Vout6 to Vout6 to various load devices. In example embodiments, the PMIC 720 may include a plurality of LDO regulators LDO1~LDOi.

Each of the plurality of LDO regulators LDO1~LDOi may employ the LDO regulator 10 of FIG. 7. Therefore, each of the plurality of LDO regulators LDO1~LDOi may include an error amplifier, a buffer, a power transistor, a feedback circuit, a monitoring circuit and/or an APAC. The monitoring circuit may generate a control voltage by monitoring a load current provided to a load from an output node, the APAC may adjust a frequency of a pole of an output of the error amplifier by selectively coupling an adjusting capacitor between an output terminal of the error amplifier and a ground voltage in response to the control voltage.

The mobile device 700 may be installed using a package of various forms. For example, the PMIC 720, the AP 741, the input/output interface unit 742, the RAM 743, the ABB 744, the display device 745 and/or the nonvolatile memory 746 may be installed using packages such as a package on package (PoP), a ball grid arrays (BGAs), a chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline integrated circuit (SOIC), a shrink small outline package (SSOP), a thin small outline package (TSOP), a thin quad flat pack (TQFP), a system in package (SIP), a multi-chip package (MCP), a wafer-level fabricated package (WFP), and a wafer-level processed stack package (WSP).

Figure 19:
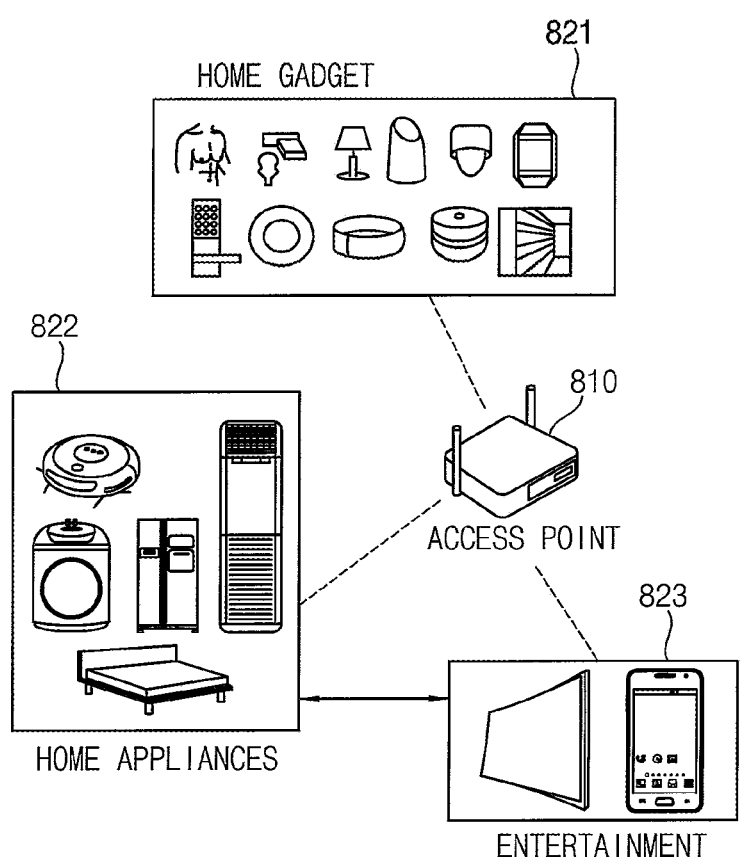
FIG. 19 is a diagram showing examples of a communication device according to example embodiments.

FIG. 19 is a diagram showing examples of a communication device according to example embodiments.

In detail, FIG. 19 shows an example in which various wireless communication devices communicate with each other in a wireless communication system using WLAN. Each of the wireless communication devices shown in FIG. 19 may include multi-band and multi-polarization antennas, in which a plurality of antenna patches are stacked, and an RFIC providing differential signals to the multi-band and multi-polarization antennas.

Home gadgets 821, home appliances 822, entertainment devices 823, and/or an access point (AP) 810 may configure an Internet of Thing (IoT) network system. Each of the home gadgets 821, the home appliances 822, the entertainment devices 823, and/or the AP 810 may include a transceiver according to one or more example embodiments as a component. The home gadgets 821, the home appliances 822, and the entertainment devices 823 may wirelessly communicate with the AP 810, or may wirelessly communicate with one another.

Example embodiments may be applied to various systems including a memory module and a memory controller that includes an ECC engine.

Any of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the present disclosure has been particularly shown and described with reference to the example embodiments thereof, it will be understood by those of ordinary skill in the art that various changes in form and detail may be made therein without departing from the spirit and scope of the present disclosure as defined by the following claims.

What is claimed is:

1. A low drop-out (LDO) regulator comprising:
an error amplifier configured to compare a reference voltage and a feedback voltage to generate a first error voltage based on the comparison;
a buffer connected to an output terminal of the error amplifier, the buffer configured to buffer the first error voltage to output a second error voltage;
a power transistor including a gate coupled to an output terminal of the buffer, the power transistor configured to regulate an input voltage based on the second error voltage to provide an output voltage to an output node;
a feedback circuit, connected between the output node and a ground voltage, the feedback circuit configured to divide the output voltage to provide the feedback voltage, the feedback circuit including
a first feedback resistor connected between the output node and a feedback node,
a second feedback resistor connected between the feedback node and the ground voltage, and
a feedback capacitor and a first p-channel metal oxide semiconductor (PMOS) transistor connected between the output node and the feedback node in parallel with the first feedback resistor, the feedback capacitor and the first PMOS transistor connected in a series between the output node and the feedback node;

a monitoring circuit, connected to the output terminal of the buffer in parallel with the power transistor, the monitoring circuit configured to generate a control voltage associated with a load current flowing from the output node to a load, based on the second error voltage and the input voltage; and an adaptive pole adjusting circuit (APAC), connected between the output terminal of the error amplifier and the ground voltage, the APAC configured to selectively connect an adjusting capacitor between the output terminal of the error amplifier and the ground voltage in response to the control voltage.

2. The LDO regulator of claim 1, wherein the feedback circuit is configured to selectively connect a feedback capacitor between the output node and a feedback node in response to the control voltage.

3. The LDO regulator of claim 1, wherein the monitoring circuit includes:
a second PMOS transistor, connected between the input voltage and a first node, which has a gate receiving the second error voltage; and
a monitoring resistor connected between the first node and the ground voltage,
wherein the seconnd PMOS transistor is configured to provide the first node with a mirror current corresponding to the load current, and
wherein the monitoring circuit is configured to provide the control voltage corresponding to the mirror current at the first node.

4. The LDO regulator of claim 3, wherein a current driving capability of the second PMOS transistor is smaller than a current driving capability of the power transistor.

5. The LDO regulator of claim 3, wherein:
the feedback capacitor includes a first terminal coupled to the output node and a second terminal coupled to the first PMOS transistor; and
the first PMOS transistor includes a source coupled to the second terminal of the feedback capacitor, a drain coupled to the feedback node and a gate to receive the control voltage.

6. The LDO regulator of claim 5, wherein the first PMOS transistor is configured to selectively connect the feedback capacitor between the output node and the feedback node in response to the control voltage.

7. The LDO regulator of claim 5, wherein:
when the load current provided to the load decreases, the mirror current decreases and the first PMOS transistor is turned-on in response to the control voltage; and
when the load current provided to the load increases, the mirror current increases and the first PMOS transistor is turned-off in response to the control voltage.

8. The LDO regulator of claim 7, wherein:
when the first PMOS transistor is turned-on, the second terminal of the feedback capacitor is coupled to the second node and a capacitance of the feedback capacitor is associated with a zero of the feedback circuit; and
when the first PMOS transistor is turned-off, the second terminal of the feedback capacitor is floated and zero of the feedback capacitor is cancelled.

9. The LDO regulator of claim 1, wherein the APAC includes:
the adjusting capacitor which has a first terminal connected to the output terminal of the error amplifier and a second terminal connected to a first node; and an n-channel metal oxide semiconductor (NMOS) transistor, connected between the first node and the ground voltage, which includes a gate receiving the control voltage.

10. The LDO regulator of claim 9, wherein:
when the load current provided to the load decreases, the NMOS transistor is turned-off in response to a level of the control voltage decreasing; and
when the load current provided to the load increases, the NMOS transistor is turned-on in response to the level of the control voltage increasing.

11. The LDO regulator of claim 10, wherein:
when the NMOS is turned-off, the second terminal of the adjusting capacitor is floated and a capacitance of the adjusting capacitor is not associated with a frequency of a pole of an output of the error amplifier; and
when the NMOS is turned-on, the second terminal of the adjusting capacitor is coupled to the ground voltage and a capacitance of the adjusting capacitor is associated with the frequency of the pole of the output of the error amplifier.

12. The LDO regulator of claim 1, further comprising:
a compensation capacitor connected between an internal node of the error amplifier and the output node; and
a bias voltage generator configured to generate a first bias voltage and a second bias voltage based on a reference current, and
wherein the error amplifier includes a negative input terminal to receive the feedback voltage and a positive input terminal to receive the reference voltage.

13. The LDO regulator of claim 12, wherein the error amplifier includes:
a second PMOS transistor connected between the input voltage and a first node;
a third PMOS transistor, connected between the input voltage and a second node, which has a gate coupled to a gate of the second PMOS transistor;
a fourth PMOS transistor, connected between the first node and a third node;
a fifth PMOS transistor, connected between the second node and a fourth node, which has a gate coupled to a gate of the fourth PMOS transistor;
a first n-channel metal oxide semiconductor (NMOS) transistor, connected between the third node and the ground voltage, which has a gate coupled to the third node;
a second NMOS transistor, connected between the fourth node and the ground voltage, which has a gate coupled to the third node;
a third NMOS transistor, connected between the first node and a fifth node, which has a gate receiving the reference voltage;
a fourth NMOS transistor, connected between the second node and the fifth node, which has a gate receiving the feedback voltage; and
a current source connected between the fifth node and the ground voltage,
wherein a gate of the second PMOS transistor and a gate of the third PMOS transistor receive the first bias voltage, and
wherein a gate of the fourth PMOS transistor and a gate of the fifth PMOS transistor receive the second bias voltage.

14. The LDO regulator of claim 13, wherein the compensation capacitor is connected between the third node and the output node.

15. The LDO regulator of claim 1, wherein the buffer includes:
- a second PMOS transistor, connected between the input voltage and a first node corresponding to the output terminal of the buffer, which has a gate coupled to the first node;
- a first resistor, connected between the input voltage and the first node in parallel with the second PMOS transistor; and
- a first n-channel metal oxide semiconductor (NMOS) transistor, connected between the first node and the ground voltage, which has a gate receiving the first error voltage.

16. A power management integrated circuit (PMIC) comprising:
- at least one switching regulator configured to generate a conversion voltage from a battery voltage;
- a plurality of low drop-out (LDO) regulators configured to generate a plurality of output voltages based on the conversion voltage to provide the plurality of output voltages to a plurality of consumers, respectively, and
- a controller configured to generate a voltage control signal to adjust a switching timing of the at least one switching regulator based on the conversion voltage, wherein each of the plurality of LDO regulators includes:
- an error amplifier configured to compare a reference voltage and a feedback voltage to generate a first error voltage based on the comparison;
- a power transistor configured to regulate the conversion voltage to provide a corresponding output voltage from among the plurality of output voltages to an output node based on a second error voltage which is based on the first error voltage;
- an adaptive pole adjusting circuit (APAC), connected between an output terminal of the error amplifier and a ground voltage, the APAC configured to selectively connect an adjusting capacitor between the output terminal of the error amplifier and the ground voltage in response to the second error voltage and a control voltage generated based on the conversion voltage; and
- a feedback circuit, connected between the output node and the ground voltage, the feedback circuit configured to divide the output voltage to provide the feedback voltage, the feedback circuit including
  - a first feedback resistor connected between the output node and a feedback node,
  - a second feedback resistor connected between the feedback node and the ground voltage, and
  - a feedback capacitor and a p-channel metal oxide semiconductor (PMOS) transistor connected between the output node and the feedback node in parallel with the first feedback resistor, the feedback capacitor and the PMOS transistor connected in series between the output node and the feedback node.

17. The PMIC of claim 16, further comprising:
- a buffer connected to the output terminal of the error amplifier, the buffer configured to buffer the first error voltage to output the second error voltage; and
- a monitoring circuit, connected to the output terminal of the buffer in parallel with the power transistor, the monitoring circuit configured to generate the control voltage based on the second error voltage and the conversion voltage.

18. The PMIC of claim 16, wherein the at least one switching regulator includes:
- a first driving transistor, connected between the battery voltage and a switching node, which has a gate receiving a first driving control signal;
- a second driving transistor, connected between the switching node and the ground voltage, which has a gate receiving a second driving control signal;
- an inductor connected between the switching node and a first output node that provides the conversion voltage;
- a current sensor configured to sense an inductor current flowing into the inductor to provide a current signal;
- an on-time generator configured to generate an on-time signal based on the current signal and the control voltage signal, the on-time signal determining on-time of the first driving transistor and the second driving transistor; and
- a gate driver configured to generate the first driving control signal and the second driving control signal based on the on-time signal.

19. A low drop-out (LDO) regulator comprising:
- an error amplifier configured to compare a reference voltage and a feedback voltage to generate a first error voltage based on the comparison;
- a buffer connected to an output terminal of the error amplifier, the buffer configured to buffer the first error voltage to output a second error voltage;
- a power transistor including a gate coupled to an output terminal of the buffer, the power transistor configured to regulate an input voltage based on the second error voltage to provide an output voltage to an output node;
- a feedback circuit, connected between the output node and a ground voltage, the feedback circuit configured to divide the output voltage to provide the feedback voltage, the feedback circuit including
  - a first feedback resistor connected between the output node and a feedback node,
  - a second feedback resistor connected between the feedback node and the ground voltage, and
  - a feedback capacitor and a first p-channel metal oxide semiconductor (PMOS) transistor connected between the output node and the feedback node in parallel with the first feedback resistor, the feedback capacitor and the first PMOS transistor connected in series between the output node and the feedback node;
- a monitoring circuit, connected to the output terminal of the buffer in parallel with the power transistor, the monitoring circuit configured to generate a control voltage associated with a load current flowing from the output node to a load, based on the second error voltage and the input voltage; and
- an adaptive pole adjusting circuit (APAC), connected between the output terminal of the error amplifier and the ground voltage, the APAC configured to selectively connect an adjusting capacitor between the output terminal of the error amplifier and the ground voltage in response to the control voltage, wherein the monitoring circuit includes:
- a second PMOS transistor, connected between the input voltage and a first node, which has a gate receiving the second error voltage; and
- a monitoring resistor connected between the first node and the ground voltage, wherein the second PMOS transistor is configured to provide the first node with a mirror current corresponding to the load current, and wherein the monitoring circuit is configured to provide the control voltage corresponding to the mirror current at the first node.

* * * * *